US011978387B2

(12) United States Patent
Kim et al.

(10) Patent No.: US 11,978,387 B2
(45) Date of Patent: May 7, 2024

(54) DISPLAY DEVICE AND DISPLAY DRIVING METHOD THAT CONTROLS A LEVEL OF BIAS VOLTAGE APPLIED TO A SOURCE ELECTRODE OF A DRIVE TRANSISTOR

(71) Applicant: LG Display Co., Ltd., Seoul (KR)

(72) Inventors: Taehun Kim, Seoul (KR); WooKyu Sang, Gyeonggi-do (KR); Moonsoo Chung, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/221,610

(22) Filed: Jul. 13, 2023

(65) Prior Publication Data

US 2024/0029626 A1 Jan. 25, 2024

(30) Foreign Application Priority Data

Jul. 25, 2022 (KR) ........................ 10-2022-0091665

(51) Int. Cl.
*G09G 3/20* (2006.01)
*G09G 3/3233* (2016.01)

(52) U.S. Cl.
CPC ......... *G09G 3/2096* (2013.01); *G09G 3/2007* (2013.01); *G09G 3/3233* (2013.01); *G09G 2300/0819* (2013.01); *G09G 2300/0842* (2013.01); *G09G 2300/0861* (2013.01); *G09G 2310/0262* (2013.01); *G09G 2310/08* (2013.01); *G09G 2320/0247* (2013.01); *G09G 2340/0442* (2013.01)

(58) Field of Classification Search
None
See application file for complete search history.

(56) References Cited

U.S. PATENT DOCUMENTS

2017/0092191 A1* 3/2017 An ....................... G09G 3/3233
2021/0350740 A1* 11/2021 Byun ....................... G09G 3/32
2022/0028333 A1* 1/2022 Jeong .................. G09G 3/3233

FOREIGN PATENT DOCUMENTS

KR 20180059651 A * 6/2018

* cited by examiner

*Primary Examiner* — Kirk W Hermann
(74) *Attorney, Agent, or Firm* — Birch, Stewart, Kolasch & Birch, LLP

(57) ABSTRACT

A display device can include a light-emitting element, a driving transistor providing a driving current to the light-emitting element using a driving voltage, and a plurality of switching transistors controlling driving of the driving transistor are disposed on a display panel. A gate driving circuit supplies scan signals to the display panel through gate lines. An emission driving circuit supplies a plurality of emission signals to the display panel through a plurality of emission signal lines. A data driving circuit supplies a data voltage to the display panel. A timing controller divides the display panel into a plurality of blocks and controls a level of a bias voltage applied to the driving transistor of a corresponding block among the plurality of blocks according to a grayscale of the data voltage supplied to the corresponding block in a low-speed mode operating at a low-speed driving frequency.

23 Claims, 12 Drawing Sheets

Skip frame

DISPLAY DEVICE AND DISPLAY DRIVING METHOD THAT CONTROLS A LEVEL OF BIAS VOLTAGE APPLIED TO A SOURCE ELECTRODE OF A DRIVE TRANSISTOR

CROSS REFERENCE TO RELATED APPLICATION

This application claims priority to Korean Patent Application No. 10-2022-0091665, filed in the Republic of Korea on Jul. 25, 2022, the entire contents of which are hereby expressly incorporated by reference into the present application.

BACKGROUND

Field

Embodiments of the present disclosure relate to a display device and a display driving method and, more particularly, to a display device and a display driving method able to reduce flicker due to the grayscale of an image, for example, during driving at a low-speed driving frequency.

Discussion of Related Art

In response to the development of the information society, a variety of demands for image displaying devices are increasing. In this regard, a range of display devices, such as liquid crystal display (LCD) devices, organic light-emitting display devices, electrophoretic display devices, micro light emitting diode display devices, and quantum dot light emitting display devices, have come into widespread use.

Among such display devices, organic light-emitting display devices are advantageous since they offer rapid response rates, high emission efficiency, high luminance, wide viewing angles, and the like, due to organic light-emitting diodes emitting light by themselves used therein.

Such an organic light-emitting display device can include organic light-emitting diodes (OLEDs) disposed in a plurality of subpixels arrayed in a display panel, and can control the OLEDs to emit light by controlling a current flowing through the OLEDs, thereby displaying an image while controlling the luminance of the subpixels.

The image data supplied to the display device can be a still image or a video in which images change at a constant or a variable rate. The video can correspond to various types of images such as sports videos, movies, and game videos, etc.

In addition, a display device can be switched to various driving modes, for example, automatically, depending on the user input or the operating state.

The description provided in the background section should not be assumed to be prior art merely because it is mentioned in or associated with the background section. The background section can include information that describes one or more aspects of the subject technology.

SUMMARY OF THE DISCLOSURE

A display device can change the driving frequency, for example, according to the type of input image data or the driving mode. While the display device is operating at a low-speed driving frequency, flicker can occur due to the grayscale of an image, which can degrade the quality of the image.

In this regard, the inventors of the present disclosure have invented a display device and a display driving method able to reduce defects or issues in image quality which can occur while operating at a low-speed driving frequency.

Embodiments of the present disclosure can provide a display device and a display driving method able to reduce defects or issues in image quality such as flickers by stably maintaining a driving transistor in a period operating at a low-speed driving frequency.

Embodiments of the present disclosure can provide a display device and a display driving method able to reduce defects or issues in image quality by varying the level of a bias voltage applied to the driving transistor according to the grayscale of an image in a period operating at a low-speed driving frequency.

Embodiments of the present disclosure can provide a display device and a display driving method able to improve image quality by varying the level of a bias voltage by reflecting the grayscale of a block-specific image of a display panel while operating at a low-speed driving frequency.

Embodiments of the present disclosure can provide a display device and a display driving method able to effectively improve image quality by controlling a bias voltage differently in a refresh frame and in a skip frame while operating at a low-speed driving frequency.

According to one or more embodiments of the present disclosure, a display device can include a display panel on which a light-emitting element, a driving transistor providing a driving current to the light-emitting element using a driving voltage, and a plurality of switching transistors controlling driving of the driving transistor are disposed; a gate driving circuit supplying a plurality of scan signals to the display panel through a plurality of gate lines; an emission driving circuit supplying a plurality of emission signals to the display panel through a plurality of emission signal lines; a data driving circuit supplying a data voltage to the display panel; and a timing controller dividing the display panel into a plurality of blocks and controlling a level of a bias voltage applied to the driving transistor of a corresponding block among the plurality of blocks according to a grayscale of the data voltage supplied to the corresponding block in a low-speed mode operating at a low-speed driving frequency.

According to one or more embodiments of the present disclosure, a display driving method of driving a display panel in which a light-emitting element, a driving transistor providing a driving current to the light-emitting element using a driving voltage, and a plurality of switching transistors controlling driving of the driving transistor are disposed, can include converting a first mode of a high-speed driving frequency to a second mode of a low-speed driving frequency; detecting a grayscale of each block of the display panel; determining the level of a bias voltage corresponding to the grayscale of each block; and controlling the level of the bias voltage applied to the driving transistor according to the blocks of the display panel.

According to one or more embodiments of the present disclosure, the display device and the display driving method can reduce defects in image quality occurring while operating at a low-speed driving frequency.

In addition, according to one or more embodiments of the present disclosure, the display device and the display driving method can reduce defects in image quality such as flicker by stably maintaining a driving transistor in a period operating at a low-speed driving frequency.

In addition, according to one or more embodiments of the present disclosure, the display device and the display driving method can reduce defects in image quality by varying the level of a bias voltage applied to the driving transistor according to the grayscale of an image in a period operating at a low-speed driving frequency.

In addition, according to one or more embodiments of the present disclosure, the display device and the display driving method can improve image quality by varying the level of a bias voltage by reflecting the grayscale of a block-specific image of a display panel while operating at a low-speed driving frequency.

In addition, according to one or more embodiments of the present disclosure, the display device and the display driving method can effectively improve image quality by controlling a bias voltage differently in a refresh frame and in a skip frame while operating at a low-speed driving frequency.

It is to be understood that both the foregoing general description and the following detailed description are exemplary and explanatory and are intended to provide further explanation of the inventive concepts as claimed.

BRIEF DESCRIPTION OF THE DRAWINGS

The above and other objectives, features, and advantages of the present disclosure will be more clearly understood from the following detailed description, taken in conjunction with the accompanying drawings, in which.

Figure 1:
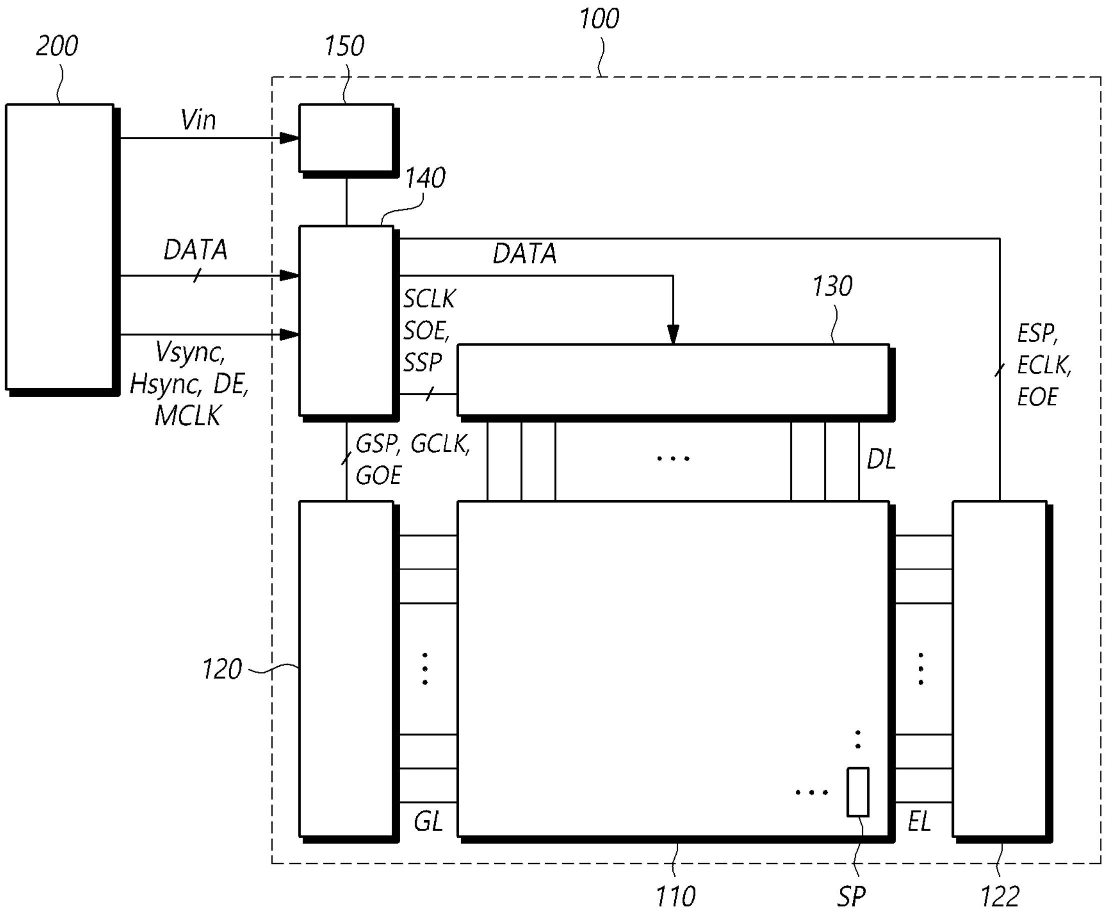
FIG. 1 is a diagram illustrating a schematic configuration of a display device according to embodiments of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Hereinafter, some embodiments of the present disclosure will be described in detail with reference to exemplary drawings. In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as “including”, “having”, “containing”, “constituting”, “made up of”, and “formed of” used herein are generally intended to allow other components to be added unless the terms are used with the term “only”. As used herein, singular forms are intended to include plural forms unless the context clearly indicates otherwise.

The shapes, sizes, ratios, angles, numbers, and the like, which are illustrated in the drawings to describe various example embodiments of the present disclosure are merely given by way of example. Therefore, the present disclosure is not limited to the illustrations in the drawings.

Terms, such as “first”, “second”, “A”, “B”, “(A)”, or “(B)” can be used herein to describe elements of the present invention. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element can be included in at least one of two or more elements that “are connected or coupled to”, “contact or overlap”, etc. each other.

When time relative terms, such as “after”, “subsequent to”, “next”, “before”, and the like, are used to describe processes or operations of elements or configurations, or flows or steps in operating, processing, manufacturing methods, these terms can be used to describe non-consecutive or non-sequential processes or operations unless the term “directly” or “immediately” is used together.

The terms, such as “below,” “lower,” “above,” “upper” and the like, can be used herein to describe a relationship between element (s) as illustrated in the drawings. It will be understood that the terms are spatially relative and based on the orientation depicted in the drawings.

The term "at least one" should be understood as including any and all combinations of one or more of the associated listed items. For example, the meaning of "at least one of a first item, a second item, and a third item" encompasses the combination of all three listed elements, combinations of any two of the three elements, as well as each individual element, the first element, the second element, and the third element.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Features of various embodiments of the present disclosure can be partially or overall coupled to or combined with each other, and can be variously inter-operated with each other and driven technically as those skilled in the art can sufficiently understand. Embodiments of the present disclosure can be carried out independently from each other, or can be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" can apply, for example, to a separate circuit or structure, an integrated circuit, a computational block of a circuit device, or any structure configured to perform a described function as should be understood to one of ordinary skill in the art.

Hereinafter, various embodiments of the present disclosure will be described in detail with reference to the accompanying drawings. All the components of each display device according to all embodiments of the present disclosure are operatively coupled and configured.

FIG. 1 is a diagram illustrating a schematic configuration of a display device 100 according to embodiments of the present disclosure.

Referring to FIG. 1, the display device 100 according to the embodiments of the present disclosure can include: a display panel 110 to which a plurality of gate lines GL and a plurality of data lines DL are connected and in which a plurality of subpixels SP are arrayed, for example, in the form of a matrix; a gate driving circuit 120 to drive the plurality of gate lines GL; an emission driving circuit 122 to drive a plurality of emission signal lines EL; a data driving circuit 130 to supply a data voltage through the plurality of data lines DL; a timing controller 140 to control the gate driving circuit 120, the emission driving circuit 122 and/or the data driving circuit 130; and a power management circuit 150. Embodiments are not limited thereto. As an example, additional components can be further included, and/or at least one of the above-mentioned components can be omitted. As an example, the emission driving circuit 122 can be omitted according to the design of the display device 100.

The display panel 110 can display an image on the basis of a scan signal transferred from the gate driving circuit 120 through the plurality of gate lines GL and a data voltage transferred from the data driving circuit 130 through the plurality of data lines DL.

When the display panel 110 is a liquid crystal display (LCD) panel, the display panel 110 can include a liquid crystal layer situated between two substrates, and can operate in any known mode, such as a twisted nematic (TN) mode, a vertical alignment (VA) mode, an in-plane switching (IPS) mode, or a fringe field switching (FFS) mode. In contrast, when the display panel 110 is an organic light-emitting display panel, the display panel 110 can be implemented using a top emission structure, a bottom emission structure, a dual emission structure, or the like.

In the display panel 110, a plurality of pixels can be arrayed in the form of a matrix. Each of the pixels is comprised of subpixels SP of different colors, for example, a red subpixel, a green subpixel, and a blue subpixel. Embodiments are not limited thereto. As an example, at least one of the pixels can further include a white subpixel. Subpixels of other combination of colors, such as cyan, magenta, and yellow, are also possible. The respective subpixels SP can be defined by the data lines DL and the gate lines GL.

A single subpixel SP is formed in an area in which a data line DL and a gate line GL intersect each other. The subpixel SP can include a thin-film transistor (TFT) for driving the subpixel SP, a light-emitting element such as an organic light-emitting diode (OLED) to which a data voltage is supplied, a storage capacitor electrically connected to the light-emitting element to maintain the voltage, and the like. However, the embodiments of present disclosure are not limited thereto, subpixel SP can include other elements.

For example, when the display device 100 having a resolution of 2,160×3,840 is comprised of four types of subpixels SP, e.g., white (W), red (R), green (G), and blue (B) subpixels, there can be 2,160 gate lines GL and a total of 15,360 (=3,840×4) data lines DL, due to 3,840 data lines DL respectively connected to four (WRGB) subpixels. The resolution, the types of subpixels, and the number of the gate lines GL and data lines DL are not limited thereto. The plurality of subpixels SP can be disposed at intersections of the gate lines GL and the data lines DL, respectively.

The gate driving circuit 120 is controlled by the controller 140. The gate driving circuit 120 controls driving timing of the plurality of subpixels SP by sequentially outputting the scan signal to the plurality of gate lines GL disposed on the display panel 110.

In the display device 100 having a resolution of 2,160×3,840, sequentially outputting the scan signal to the 2,160 gate lines GL from the first gate line to the 2,160$^{th}$ gate line can be referred to as 2,160-phase driving. Alternatively, sequentially outputting the scan signal to four respective gate lines, for example, sequentially outputting the scan signal to the first to fourth gate lines and then sequentially outputting the scan signal to the fifth to eighth gate lines, can be referred to as four-phase driving. As an example, sequentially outputting the scan signal for N number of respective gate lines GL can be referred to as N-phase driving.

Figure 2:
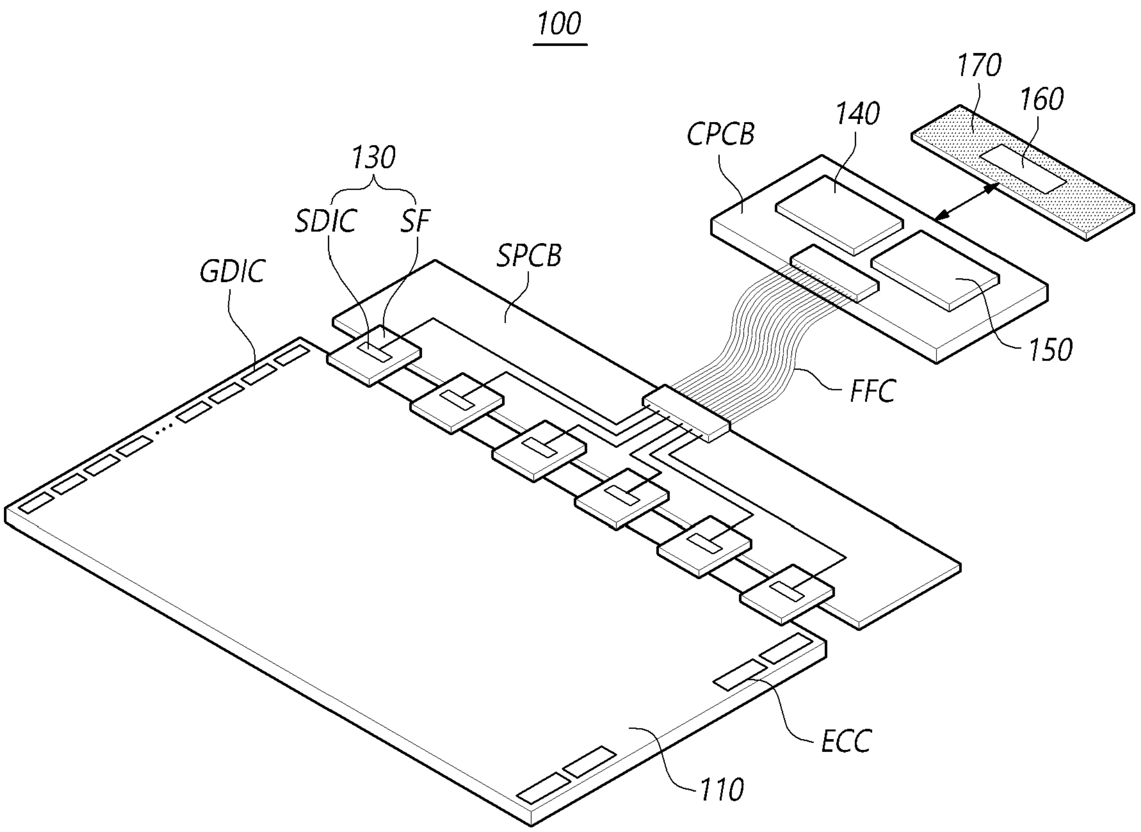
FIG. 2 is an example diagram illustrating a system of the display device according to embodiments of the present disclosure.

Here, the gate driving circuit 120 can include one or more gate driving integrated circuits GDIC (see FIG. 2). The gate driving circuit 120 can be located on one or both sides of the display panel 110 depending on the driving method. Alternatively, the gate driving circuit 120 can be implemented using a gate-in-panel (GIP) structure disposed inside of the bezel of the display panel 110. Embodiments are not limited thereto. As an example, the gate driving circuit 120 can be connected to the display panel 110 in a tape automated bonding (TAB) type, or connected to the display panel 110 in a chip on glass (COG) type or a chip on panel (COP) type, or connected to the display panel 110 in a chip on film (COF) type.

Here, the gate driving circuit 120 being located to the left of the display panel 110 and the emission driving circuit 122 being located to the right of the display panel 110 are illustrated as an example. As an example, the gate driving circuit 120 and the emission driving circuit 122 can be disposed in the same position or exchanged with each other.

The emission driving circuit 122 outputs an emission signal EM (see FIG. 5) under the control of the timing controller 140 and supplies the emission signal EM to the display panel 110 through the emission signal lines EL.

The emission driving circuit 122 can sequentially supply the emission signal EM to the emission signal lines EL by shifting the emission signal EM using a shift register. Here, as an example, under the control of the timing controller 140, the emission driving circuit 122 can drive the display panel 110 at a predetermined duty ratio, for example, a duty ratio of 30%, 50%, or 80%, etc., by repeatedly toggling the emission signal EM during an image driving period. The predetermined duty ratio could be any ratio less than 100%.

The emission driving circuit 122 can include one or more emission control circuits ECC (see FIG. 2), and can be located on one or both sides of the display panel 110 depending on the driving method. The emission driving circuit 122 can be directly provided on the display panel 110 together with the gate driving circuit 120 by a gate-in-panel (GIP) process, without being limited thereto. As an example, the emission driving circuit 122 can be connected to the display panel 110 in a tape automated bonding (TAB) type, or connected to the display panel 110 in a chip on glass (COG) type or a chip on panel (COP) type, or connected to the display panel 110 in a chip on film (COF) type. As an example, the emission driving circuit 122 can be connected to the display panel 110 in the same way as or in a different way from the gate driving circuit 120.

A one-frame period can be divided into a recording period in which recording is performed as a data voltage is applied to each of the subpixels SP and an emission period in which the subpixel SP emits light at the predetermined duty ratio in response to the emission signal EM after the recording period, without being limited thereto. In general, the emission signal EM can cause the subpixel SP to emit light at the duty ratio of 50% or less during the emission period, without being limited thereto. Since the recording period is only about 1 horizontal period (1H) or more horizontal periods, most of (e.g., the remaining portion) the one-frame period corresponds to the emission period.

During the recording period, the storage capacitor of the subpixel SP is charged with the data voltage. The subpixel SP repeats lighting on and off in response to the emission signal EM. For example, the subpixel SP repeats lighting on and off operations by emitting light at the duty ratio of 50% or less by repeating lighting on and off in the one-frame period.

In this manner, after being lit off, the subpixel SP emits light using the voltage charged in the storage capacitor. Thus, during the emission period after the recording period, the subpixel SP can display data at the same luminance at the duty ratio of 50% or less during the one-frame period without being provided with an additional data voltage.

The data driving circuit 130 receives image data DATA from the timing controller 140 and converts the received image data DATA into an analog data voltage. Afterwards, the data driving circuit 130 outputs the data voltage to the respective data lines DL at timing at which the scan signal is applied through the gate lines GL. At timing at which the emission signal EM is applied, each of the subpixels SP connected to the data lines DL emits light having a luminous intensity corresponding to the data voltage.

In the same manner, the data driving circuit 130 can include one or more source driving integrated circuits SDIC (see FIG. 2). The source driving integrated circuits SDIC can be connected to bonding pads of the display panel 110 using a tape-automated-bonding (TAB) structure or a chip-on-glass (COG) structure or can be directly disposed on the display panel 110 (COP).

In some cases, each of the source driving integrated circuits SDIC can be integrated into the display panel 110. In addition, each of the source driving integrated circuits SDIC can be implemented using a chip-on-film (COF) structure. In this case, each of the source driving integrated circuits SDIC can be mounted on a circuit film and electrically connected to the corresponding data line DL of the display panel 110 through the circuit film.

The timing controller 140 supplies a variety of control signals to the gate driving circuit 120, the emission driving circuit 122, and the data driving circuit 130 and controls the operation of the gate driving circuit 120, the emission driving circuit 122, and the data driving circuit 130. For example, the timing controller 140 controls the gate driving circuit 120 to output the scan signal and the emission driving circuit 122 to output the emission signal EM at timing defined for respective frames, and transfers the image data DATA received from an external source to the data driving circuit 130, without being limited thereto.

Here, the timing controller 140 receives a variety of timing signals including a vertical synchronization signal Vsync, a horizontal synchronization signal Hsync, a data enable signal DE, and a main clock MCLK, as well as the image data DATA, from an external device, such as a host system 200.

The host system 200 can be one selected from among a television (TV) system, a set-top box, a navigation system, a personal computer (PC), a home theatre system, a mobile device, a wearable device, or the like.

Thus, the timing controller 140 generates control signals using a variety of timing signals received from the host system 200 and transfers the control signals to the gate driving circuit 120, the emission driving circuit 122, and the data driving circuit 130.

For example, the timing controller 140 outputs a variety of gate control signals including agate start pulse GSP, a gate clock GCLK, a gate output enable signal GOE, and the like in order to control the gate driving circuit 120. Here, the gate start pulse GSP controls timing at which the one or more gate driving integrated circuits GDIC of the gate driving circuit 120 start operating. In addition, the gate clock GCLK is a clock signal input to the one or more gate driving integrated circuits GDIC in common and controls shift timing of the scan signal. In addition, the gate output enable signal GOE designates timing information of the one or more gate driving integrated circuits GDIC.

In addition, the timing controller 140 outputs a variety of emission signals including an emission start pulse ESP, an emission clock ECLK, an emission output enable signal EOE, and the like in order to control the emission driving circuit 122. Here, the emission start pulse ESP controls timing at which the one or more emission control circuits ECC of the emission driving circuit 122 start operating. In addition, the emission clock ECLK is a clock signal input to the one or more emission control circuits ECC in common, and controls shift timing of the emission signal. The emission output enable signal EOE designates timing information of the one or more emission control circuits ECC.

In addition, the timing controller 140 outputs a variety of data control signals including a source start pulse SSP, a source sampling clock SCLK, a source output enable signal SOE, and the like in order to control the data driving circuit 130. Here, the source start pulse SSP controls timing at which the one or more source driving integrated circuits SDIC of the data driving circuit 130 start data sampling. The source sampling clock SCLK is a clock signal for controlling timing at which the source driving integrated circuits SDIC sample data. The source output enable signal SOE controls output timing of the data driving circuit 130.

The display device 100 can include the power management circuit 150 to supply a variety of voltages or currents to the display panel 110, the gate driving circuit 120, the emission driving circuit 122, the data driving circuit 130, and the like or to control the variety of voltages or currents to be supplied.

The power management circuit 150 generates power required to drive the display panel 110, the gate driving circuit 120, the emission driving circuit 122, and the data driving circuit 130 by adjusting a DC input voltage Vin supplied from an external device, such as the host system 200.

In addition, the subpixels SP are located at intersections of the gate lines GL and the data lines DL. The light-emitting elements can be disposed in the subpixels SP, respectively. For example, the organic light-emitting display device includes light-emitting elements such as OLEDs in the subpixels, respectively. The organic light-emitting display device can display images by controlling current flowing through the light-emitting elements according to the data voltage.

The display device 100 can be any of a variety of displays including an LCD, an organic light-emitting display, a micro-LED display, a quantum dot display, and the like.

FIG. 2 is an example diagram illustrating a system of the display device according to embodiments of the present disclosure.

Referring to FIG. 2, the display device 100 according to the embodiments of the present disclosure is an example in which the source driving integrated circuits SDIC of the data driving circuit 130 are implemented using a COF structure from among a variety of structures such as TAB, COG, and COF structures, and the gate driving circuit 120 and the emission driving circuit 122 are implemented using a GIP structure from among a variety of structures such as TAB, COG, COF, and GIP structures.

When the gate driving circuit 120 has the GIP structure, the plurality of gate driving integrated circuits GDIC of the gate driving circuit 120 can be directly formed within the bezel of the display panel 110. Here, the gate driving integrated circuits GDIC can be provided with a variety of signals (e.g., a clock signal, a gate high signal, and a gate low signal) required for generation of scan signals through gate driving-related signal lines disposed, for example, within the bezel.

In addition, when the emission driving circuit 122 has the GIP structure, the emission control circuits ECC of the emission driving circuit 122 can be directly formed within the bezel of the display panel 110. Here, the emission control circuits ECC can be provided with a variety of signals (e.g., a clock signal and an emission signal) required for generation of emission signals through emission driving-related signal lines disposed, for example, within the bezel.

In the same manner, the source driving integrated circuits SDIC of the data driving circuit 130 can be mounted on source films SF, respectively. One side of each of the source films SF can be electrically connected to the display panel 110. In addition, conductive lines electrically connecting the source driving integrated circuits SDIC to the display panel 110 can be disposed on the source films SF, for example, the top portions of the source films SF.

The display device 100 can include at least one source printed circuit board SPCB and a control printed circuit board CPCB for circuit connection of the plurality of source driving integrated circuits SDIC to other devices. Here, control components and a variety of electrical devices can be mounted on the control printed circuit board CPCB.

Here, the other sides of the source films SF on which the source driving integrated circuits SDIC are mounted can be connected to the source printed circuit board SPCB. For example, each of the source films SF on which the source driving integrated circuits SDIC are mounted can be configured such that one side thereof is electrically connected to the display panel 110 and the other side thereof is electrically connected to the source printed circuit board SPCB.

The timing controller 140 and/or the power management circuit 150 can be mounted on the control printed circuit board CPCB, without being limited thereto. The timing controller 140 can control the operation of the data driving circuit 130, the gate driving circuit 120, and the emission driving circuit 122. The power management circuit 150 can supply a driving voltage or current to the display panel 110, the data driving circuit 130, the gate driving circuit 120, the emission driving circuit 122, and the like and/or can control the supplied voltage or current.

The source printed circuit board SPCB and the control printed circuit board CPCB can be circuit-connected to each other through at least one connecting member. The connecting member can be, for example, a flexible flat cable FFC, a flexible printed circuit (FPC), or the like. In addition, the source printed circuit board SPCB and the control printed circuit board CPCB can be integrated into a single printed circuit board.

The display device 100 can further optionally include a set board 170 electrically connected to the control printed circuit board CPCB. Here, the set board 170 can also be referred to as a power board. The set board 170 can be provided with a main power management circuit 160 to manage the overall power of the display device 100. The main power management circuit 160 can work in concert with the power management circuit 150.

In the display device 100 having the above-described configuration, a driving voltage is generated by the set board 170 and transferred to the power management circuit 150 in the control printed circuit board CPCB. The power management circuit 150 transfers the driving voltage, required for display driving or characteristic value sensing, to the source printed circuit board SPCB through the flexible printed circuit or the flexible flat cable FFC. The driving voltage transferred to the source printed circuit board SPCB is supplied through the driving integrated circuits SDIC in order to, for example, light or sense a specific subpixel SP in the display panel 110.

Here, each of the subpixels SP arrayed in the display panel 110 of the display device 100 can include a light-emitting element and circuit elements, such as a driving transistor, for driving the light-emitting element.

The type and number of circuit elements in each of the subpixels SP can be determined variously depending on functions to be provided, designs, and the like.

Figure 3:
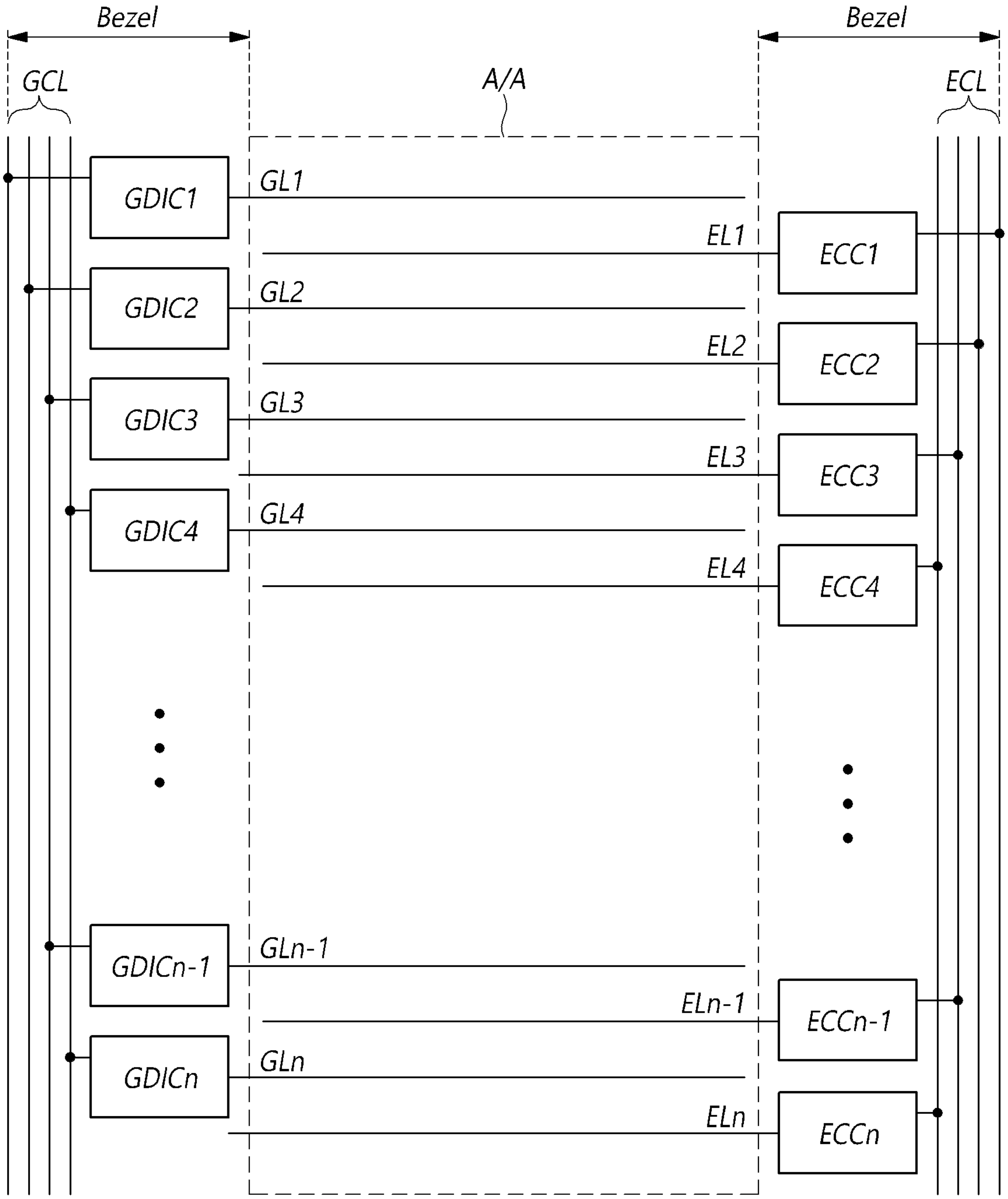
FIG. 3 is a diagram illustrating a display panel in which a gate driving circuit and an emission driving circuit are implemented using a GIP structure according to embodiments of the present disclosure.

FIG. 3 is a diagram illustrating a display panel according to embodiments of the present disclosure in which the gate driving circuit and the emission driving circuit are implemented using a GIP structure.

Referring to FIG. 3, in the display device 100 according to the embodiments, n number of gate lines GL1 to GLn (where n is a natural number) and n number of emission signal lines EL1 to ELn (where n is a natural number) can be disposed in an active area A/A on which images are displayed. Although the number of gate lines and the number of emission signal lines are the same here, embodiments are not limited thereto. As an example, the number of gate lines and the number of emission signal lines can be different.

Here, the active area A/A is an area in which a plurality of subpixels SP for emitting light of corresponding colors, for example, white, red, green, and/or blue subpixels, or subpixels of other colors, are disposed to display images. In addition, as an example, at least one dummy pixels can be optionally disposed in some positions of the active area A/A. The dummy pixels emit no light due to a scan signal and/or a data voltage Vdata being not applied thereto. As an example, the dummy pixels can have load similar to that of the subpixels SP.

In embodiments of the present disclosure, a plurality of subpixel areas emitting light of corresponding colors and areas in which the dummy pixels emitting no light are disposed will be collectively referred to as the active area A/A. Alternatively, the plurality of subpixel areas emitting light of corresponding colors and the areas in which the dummy pixels emitting no light are disposed can also be collectively referred to as a pixel array.

The gate driving circuit 120 can include n number of gate driving integrated circuits GDIC1 to GDICn corresponding to the n number of gate lines GL1 to GLn. The n number of gate driving integrated circuits GDIC1 to GDICn can be disposed within the bezel in which no pixels are provided, for example, on one side of the active area A/A.

Thus, the n number of gate driving integrated circuits GDIC1 to GDICn can output a scan signal to the n number of gate lines GL1 to GLn, respectively.

In addition, the emission driving circuit 122 can include n number of emission control circuits ECC1 to ECCn corresponding to the n number of emission signal lines EL1 to ELn. The n number of emission control circuits ECC1 to ECCn can be disposed within the bezel in which no pixels are provided, for example, on the other side of the active area A/A. As an example, the n number of emission control circuits ECC1 to ECCn can be disposed on the other side of the active area A/A opposite to the one side.

Thus, the n number of emission control circuits ECC1 to ECCn can output an emission signal EM to the n number of emission signal lines EL1 to ELn, respectively.

In this manner, when the gate driving circuit 120 and the emission driving circuit 122 are implemented using a GIP structure, operations of fabricating separate integrated circuits having a gate drive function or an emission function and bonding the separate integrated circuits to the display panel 110 are not required. Thus, the number of integrated circuits can be reduced, and the process of connecting the integrated circuits to the display panel 110 can be omitted. In addition, the size of the bezel in the display panel 110 in which the integrated circuits are bonded can be reduced.

Alternatively, the n number of gate driving integrated circuits GDIC1 to GDICn and the n number of emission control circuits ECC1 to ECCn can be disposed together within the bezel on one side.

Within the bezel with no pixels on one side of the active area A/A, a plurality of clock lines GCL for transferring gate clocks GCLK necessary for generation and output of the scan signal can be disposed.

In addition, within the bezel with no pixels on the other side of the active area A/A, a plurality of emission clock lines ECL for transferring emission clocks ECLK necessary for generation and output of the emission signal EM can be disposed.

Figure 4:
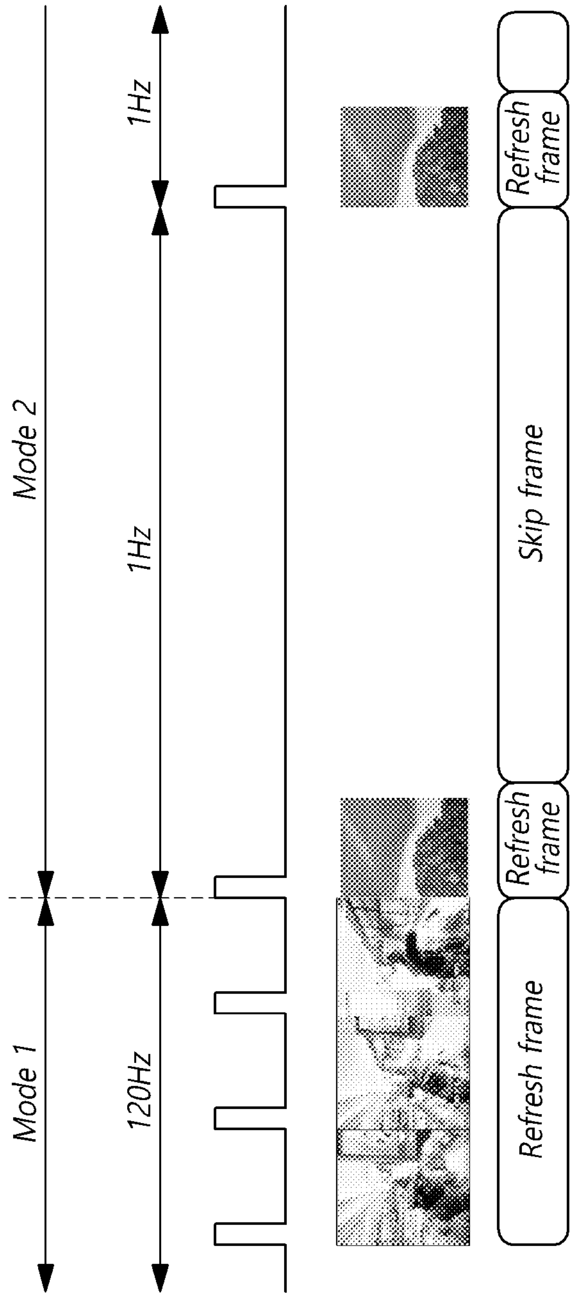
FIG. 4 is a diagram schematically illustrating driving modes according to changes infrequency in the display device according to embodiments of the present disclosure.

FIG. 4 is a diagram schematically illustrating driving modes according to changes infrequency in the display device according to embodiments of the present disclosure.

Referring to FIG. 4, operating modes of the display device 100 according to the embodiments of the present disclosure can be divided into a first mode Mode 1 in which an image is displayed while changing at a high-speed first frequency and a second mode Mode 2 in which a still image or a low-speed image is displayed at a low-speed second frequency. Embodiments are not limited thereto. As an example, the operating modes of the display device 100 can further include a third mode in which an image is displayed at a third frequency different from the first frequency or the second frequency.

For example, in the first mode Mode 1, the display panel 110 can display image data with full color at a frequency of 120 Hz corresponding to the first frequency. While the display device 100 is operating in the first mode Mode 1, the subpixels SP of the display panel 110 display image data DATA transferred from the timing controller 140 at every 120 frames.

In this manner, a period in which an image is continuously displayed or updated on the display panel 110 at a high-speed driving frequency can be referred to as a refresh frame. For example, when the driving frequency is 120 Hz, all of 120 frames during 1 second in the first mode Mode 1 can be refresh frames in which image data is displayed or updated.

In addition, when the display device 100 is operating in the second mode Mode 2 in which a still image or a low-speed image is displayed, the display device 100 can display a designated image on the display panel 110 during an initial period of the second mode Mode 2 and may not output or update the image data on the display panel 110 during the remaining time.

For example, when entering the second mode Mode 2, the display device 100 can change the driving frequency from the first frequency of 120 Hz to the second frequency of 1 Hz. Here, in the second mode Mode 2 in which the driving frequency is changed to 1 Hz, an image displayed in the last period of the first mode Mode 1 is displayed on the display panel 110. Embodiments are not limited thereto. As long as the second frequency is less than the first frequency, the first frequency and the second frequency could be any frequency other than 120 Hz or 1 Hz.

For example, in the second mode Mode 2 operating at 1 Hz, the display device 100 can operate so that the image displayed in the last period of the first mode Mode 1 is displayed or updated on the display panel 110 once and no image is displayed or updated during the remaining time.

In this case, in the second mode Mode 2, each of the subpixels SP displays or updates an image once, but can maintain a voltage stored in the storage capacitor Cst during the remaining time. The period in which no image data is transferred to the display panel 110 and the voltage stored in the storage capacitor Cst is maintained can be referred to as a skip frame. For example, when the driving frequency is 120 Hz, the first frame in the second mode Mode 2 can be a refresh frame in which image data is displayed and the remaining frames can be skip frames in which no image data is output.

In this manner, in the low-speed driving second mode Mode 2, image data is not displayed in a predetermined period (i.e., skip frames), and thus power consumption can be reduced.

Figure 5:
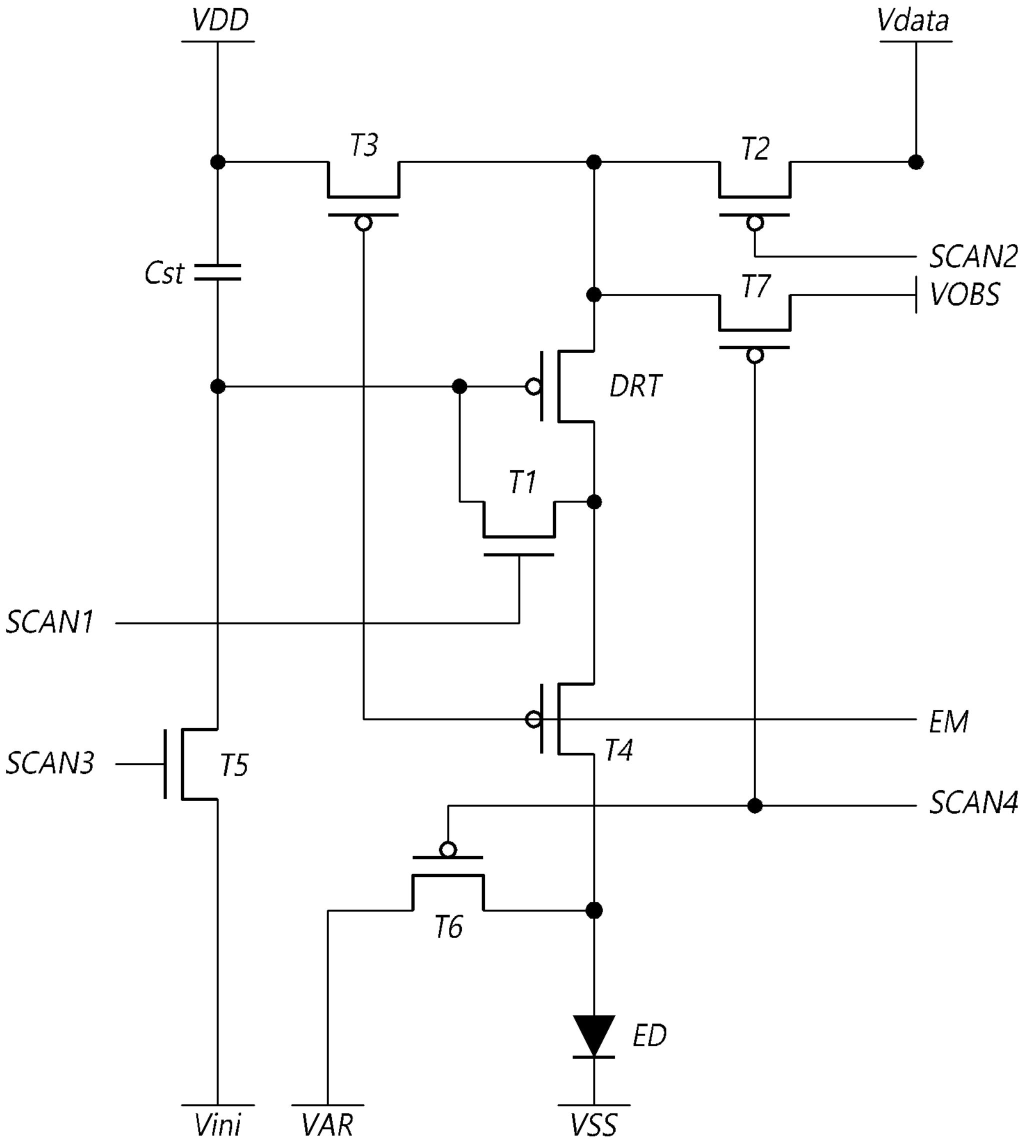
FIG. 5 is a diagram illustrating a subpixel circuit of the display device according to embodiments of the present disclosure.

FIG. 5 is a diagram illustrating a subpixel circuit of the display device according to embodiments of the present disclosure.

Referring to FIG. 5, a subpixel SP of the display device 100 according to the embodiments includes first to seventh switching transistors T1 to T7, a driving transistor DRT, a storage capacitor Cst, and a light-emitting element ED.

Here, the light-emitting element ED can be a self-light-emitting element, such as an organic light emitting diode (OLED) or a light-emitting diode (LED), able to emit light by itself, without being limited thereto.

In the subpixel SP according to the embodiments, the second to fourth switching transistors T2 to T4, the sixth switching transistor T6, the seventh switching transistor T7, and the driving transistor DRT can be P-type transistors, while the first switching transistor T1 and the fifth switching transistor T5 can be N-type transistors, without being limited thereto. As an example, any of the first to seventh switching transistors T1 to T7 and the driving transistor DRT can be either a P-type transistor or a N-type transistor.

P-type transistors are more reliable than N-type transistors. When the driving transistor DRT is formed of a P-type transistor, there is an advantage in that current flowing through the light-emitting element ED is not fluctuated by the capacitor Cst, since the drain electrode is fixed to a high-potential driving voltage VDD. Thus, it is easy to reliably supply current.

For example, P-type transistors can be connected to an anode of the light-emitting element ED. Here, when the transistors T4 and T6 connected to the light-emitting element ED operate in a saturation region, reliability is relatively high, since a predetermined amount of current can be flown irrespective of changes in the current and threshold voltage of the light-emitting element ED.

In this structure of the subpixel SP, each of the N-type transistors T1 and T5 can be formed of an oxide transistor (e.g., a transistor having a channel formed from a semiconducting oxide such as an In, Ga, or Zn oxide or an indium gallium zinc oxide (IGZO), etc.) formed using a semiconducting oxide, while each of the P-type transistors DRT, T2 to T4, T6, and T7 can be formed of a silicon (Si) transistor (e.g., a transistor referred to as a low-temperature polycrystalline silicon (LTPS) transistor having a poly-Si channel formed using a low-temperature process) formed from a transistor material such as Si. But embodiments are not limited thereto. As an example, any of the first to seventh switching transistors T1 to T7 and the driving transistor DRT can be the oxide transistor, the silicon transistor and a transistor with other semiconductor materials.

The oxide transistor is characterized by a lower leakage current than the silicon transistor. Thus, when a transistor is formed of an oxide transistor, a leakage current from the gate electrode of the driving transistor DRT can be reduced or prevented, thereby reducing defects in image quality such as flicker.

In addition, as an example, each of the P-type transistors DRT, T2 to T4, T6, and T7, except for the N-type transistors such as the first switching transistor T1 and the fifth switching transistor T5, can be formed of an LTPS transistor. However, the present disclosure is not limited thereto, and the N-type transistors and the P-type transistors can have the same or different configurations.

The gate electrode of the first switching transistor T1 is provided with a first scan signal SCAN1. The drain electrode of the first switching transistor T1 is connected to the gate electrode of the driving transistor DRT. In addition, the source electrode of the first switching transistor T1 is connected to the source electrode of the driving transistor DRT. The drain electrode and the source electrode of the switching transistor can vary depending on flow of current.

The first switching transistor T1 can be turned on by the first scan signal SCAN1 to control the operation of the driving transistor DRT using the high-potential driving voltage VDD stored in the storage capacitor Cst.

The first switching transistor T1 can be formed of an oxide transistor, in particular, an N-type metal oxide semiconductor (MOS) transistor, without being limited thereto. Since the N-type MOS transistor uses electrons as carriers instead of holes, the N-type MOS transistor can have higher mobility and thus higher switching speeds than a P-type MOS transistor.

The gate electrode of the second switching transistor T2 is provided with a second scan signal SCAN2. The source electrode of the second switching transistor T2 can be provided with a data voltage Vdata. The drain electrode of the second switching transistor T2 is connected to the source electrode of the driving transistor DRT.

The second switching transistor T2 is turned on by the second scan signal SCAN2 to supply the data voltage Vdata to the source electrode of the driving transistor DRT.

The gate electrode of the third switching transistor T3 is provided with an emission signal EM. The source electrode of the third switching transistor T3 is provided with the high-potential driving voltage VDD. The drain electrode of the third switching transistor T3 is connected to the source electrode of the driving transistor DRT.

The third switching transistor T3 is turned on by the emission signal EM to supply the high-potential driving voltage VDD to the source electrode of the driving transistor DRT.

The gate electrode of the fourth switching transistor T4 is provided with the emission signal EM. The source electrode of the fourth switching transistor T4 is connected to the drain electrode of the driving transistor DRT. The drain electrode of the fourth switching transistor T4 is connected to the anode of the light-emitting element ED.

The fourth switching transistor T4 is turned on by the emission signal EM to supply a driving current to the anode of the light-emitting element ED.

The gate electrode of the fifth switching transistor T5 is provided with a third scan signal SCAN3.

Here, the third scan signal SCAN3 can be a signal having a different phase from the first scan signal SCAN1 supplied to a subpixel SP in another position. For example, when the first scan signal SCAN1 is applied to the nth gate line, the third scan signal SCAN3 can be a first scan signal SCAN1 [$n-9$] applied to the (n−9)th gate line, without being limited thereto. As an example, the third scan signal SCAN3 can use the first scan signal SCAN1, the gate line GL of which differs depending on the phase at which the display panel 110 is driven.

The source electrode of the fifth switching transistor T5 is provided with an initialization voltage Vini. The drain electrode of the fifth switching transistor T5 is connected to the gate electrode of the driving transistor DRT and the storage capacitor Cst.

The fifth switching transistor T5 is turned on by the third scan signal SCAN3 to supply the initialization voltage Vini to the gate electrode of the driving transistor DRT.

The gate electrode of the sixth switching transistor T6 is provided with a fourth scan signal SCAN4.

The drain electrode of the sixth switching transistor T6 is provided with a reset voltage VAR. The source electrode of the sixth switching transistor T6 is connected to the anode of the light-emitting element ED.

The sixth switching transistor T6 and the seventh switching transistor T7 can be turned on by the fourth scan signal SCAN4.

The sixth switching transistor T6 supplies the reset voltage VAR to the anode of the light-emitting element ED.

The source electrode of the seventh switching transistor T7 is provided with a bias voltage VOBS. The drain electrode of the seventh switching transistor T7 is connected to the source electrode of the driving transistor DRT.

In addition, since the fourth scan signal SCAN4 is a signal for applying the bias voltage VOBS to the driving transistor DRT and applying the reset voltage VAR to the anode of the light-emitting element ED, the fourth scan signal SCAN4 can be distinguished from the second scan signal SCAN2 for applying the data voltage Vdata.

The gate electrode of the driving transistor DRT is connected to the drain electrode of the first switching transistor T1. The source electrode of the driving transistor DRT is connected to the drain electrode of the second switching transistor T2. The drain electrode of the driving transistor DRT is connected to the source electrode of the first switching transistor T1.

The driving transistor DRT is turned on due to the difference in voltage between the source electrode and the drain electrode of the first switching transistor T1, and thus the driving current is applied to the light-emitting element ED.

The high-potential driving voltage VDD is applied to one side of the storage capacitor Cst, and the other side of the storage capacitor Cst is connected to the gate electrode of the driving transistor DRT. The storage capacitor Cst stores a voltage on the gate electrode of the driving transistor DRT.

The anode of the light-emitting element ED is connected to the drain electrode of the fourth switching transistor T4 and the source electrode of the sixth switching transistor T6. A low-potential driving voltage VSS is applied to the cathode of the light-emitting element ED.

The light-emitting element ED generates light having a predetermined luminous intensity by using the driving current flowing therethrough due to the driving transistor DRT.

Here, the initialization voltage Vini is supplied to stabilize changes in capacitance generated in the gate electrode of the driving transistor DRT, while the reset voltage VAR is supplied to reset the anode of the light-emitting element ED.

When the reset voltage VAR is supplied to the anode of the light-emitting element ED in a state in which the fourth switching transistor T4 located between the anode of the light-emitting element ED and the driving transistor DRT to be controlled by the emission signal EM is turned off, the anode of the light-emitting element ED can be reset.

The sixth switching transistor T6 supplying the reset voltage VAR is connected to the anode of the light-emitting element ED.

The third scan signal SCAN3 for driving the driving transistor DRT or stabilizing the driving transistor DRT and the fourth scan signal SCAN4 for controlling the supply of the reset voltage VAR to the anode of the light-emitting element ED are separated so that the operation of driving the driving transistor DRT and the operation of resetting the anode of the light-emitting element ED can be performed separately.

In this case, the subpixel SP can be configured to turn off the fourth switching transistor T4 connecting the drain electrode of the driving transistor DRT and the anode of the light-emitting element ED when turning on the switching transistors T5 and T6 supplying the initialization voltage Vini and the reset voltage VAR, respectively, thereby blocking flow of the driving current of the driving transistor DRT to the anode of the light-emitting element ED and reducing or preventing other voltages from having an effect on the anode than the reset voltage VAR.

The subpixel SP including the eight transistors DRT, T1, T2, T3, T4, T5, T6, and T7 and the single capacitor Cst as described above can be referred to as having an 8T1C structure. Embodiments are not limited thereto. As an example, the subpixel SP can include more or less transistors or more or less capacitors. As an example, 2T1C, 3T1C, 5T1C, 5T2C, 9T1C, 9T2C, etc. structures are also possible.

As described above, the 8T1C structure among a variety of circuit structures of the subpixel SP has been illustrated hereinabove, and the structure and number of the transistors and the capacitors of the subpixel SP can be changed variously. Respective subpixels among the plurality of subpixels SP can have the same structure or at least one subpixel among the plurality of subpixels SP can have a different structure.

The power management circuit 150 of the display device 100 according to embodiments can supply the bias voltage VOBS corresponding to the grayscale of image data supplied in a refresh frame period to the source electrode of the driving transistor DRT under the control of the timing controller 140.

For example, when the image data supplied in the refresh frame period is comprised of low grayscale levels, the display panel 110 displays an image having a grayscale level close to black. Thus, even in the case in which the image has a defect, there is a low possibility that the defect can be visually recognized by a user. In contrast, when the image data supplied in the refresh frame period is comprised of high grayscale levels, an image having a grayscale level close to white is displayed on the display panel 110. Thus, even in the case in which the image has a minor defect, there is a high possibility that the minor defect can be visually recognized by the user.

In consideration of such characteristics, the image defect visually recognized by the user can be reduced by setting the bias voltage VOBS to a high level when the image data supplied in the refresh frame period is comprised of low grayscale levels and setting the bias voltage VOBS to a low level when the image data supplied in the refresh frame period is comprised of high grayscale levels.

Figure 6:
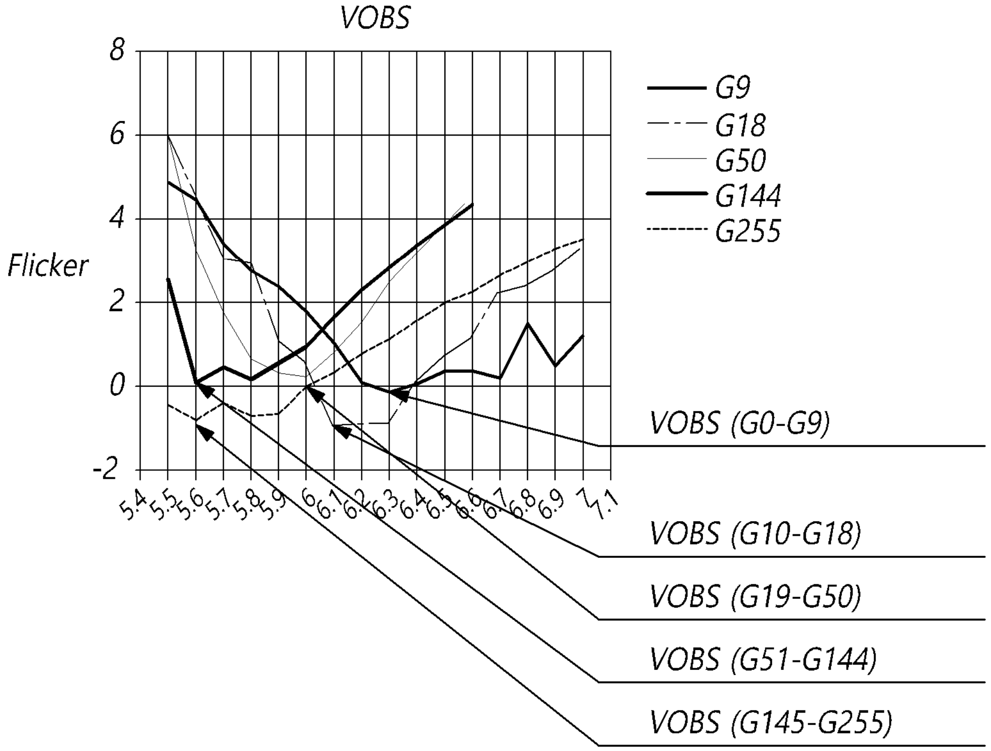
FIG. 6 is diagram illustrating a case in which image data supplied in a refresh frame period is divided into a plurality of grayscales and a bias voltage is set differently according to the grayscale of the image data according to embodiments of the present disclosure.

FIG. 6 is diagram illustrating a case in which image data supplied in a refresh frame period is divided into a plurality of grayscales and a bias voltage is set differently according to the grayscale of the image data according to embodiments of the present disclosure.

Referring to FIG. 6, in the display device 100 according to the embodiments, the bias voltage VOBS capable of reducing image defects can have different levels according to the grayscale of the image data.

In this case, in the bias voltage VOBS applied in a bias period OBS, a voltage causing few or fewest image defects according to the grayscale of the image data can be determined to be an optimal level.

For example, when the image data supplied in the refresh frame period is 9 grayscale G9, the bias voltage VOBS capable of reducing or minimizing image defects can be set to a grayscale range VOBS (G0-G9) of from 0 grayscale G0 to 9 grayscale G9. When the image data supplied in the refresh frame period is 18 grayscale G18, the bias voltage VOBS capable of reducing or minimizing image defects can be set to a grayscale range VOBS (G10-G18) of from 10 grayscale G10 to 18 grayscale G18.

In addition, the bias voltage VOBS capable of reducing or minimizing image defects when the image data supplied in the refresh frame period is 50 grayscale G50 can be set to a grayscale range VOBS (G19-G50) of from 19 grayscale G19 to 50 grayscale G50. The bias voltage VOBS capable of reducing minimizing image defects when the image data supplied in the refresh frame period is 144 grayscale G144 can be set to a grayscale range VOBS (G51-G144) of from 51 grayscale G51 to 144 grayscale G144.

In addition, the bias voltage VOBS capable of reducing or minimizing image defects when the image data supplied in the refresh frame period is 255 grayscale G255 can be set to a grayscale range VOBS (G145-G255) of from 145 grayscale G145 to 255 grayscale G255.

The above-described levels of the bias voltage VOBS corresponding to the grayscale levels of the image data are provided as an example, and the grayscale levels of the image data for determining the levels of the bias voltage VOBS can be changed variously.

Such grayscale of the image data can be determined according to the on-pixel ratio (OPR) indicating the ratio between emitting pixels and non-emitting pixels of the display panel 110 in a specific frame. Although the OPR can be based on the entire periods of the display panel 110, the display panel 110 can be divided into any number of blocks and the grayscale of a specific block can be determined according to the OPR in the blocks. Embodiments are not limited thereto. As an example, the grayscale of a specific block can be determined according to the OPR in other blocks such as an adjacent block. As another example, the grayscale of the entirety of the display panel 110 can be determined according to the OPR in at least one of the blocks of the display panel. As another example, the grayscale of the image data can be determined according to the OPR indicating the ratio between emitting pixels and non-emitting pixels of the display panel 110 in specific multiple frames.

In this manner, the use of the bias voltage VOBS can precisely reduce image defects visually recognized by the user by dividing the grayscale of the image data input in the refresh frame period into a plurality of ranges and determining a voltage causing few or even fewest image defects according to the respective grayscale ranges to be an optimal level.

Figure 7:
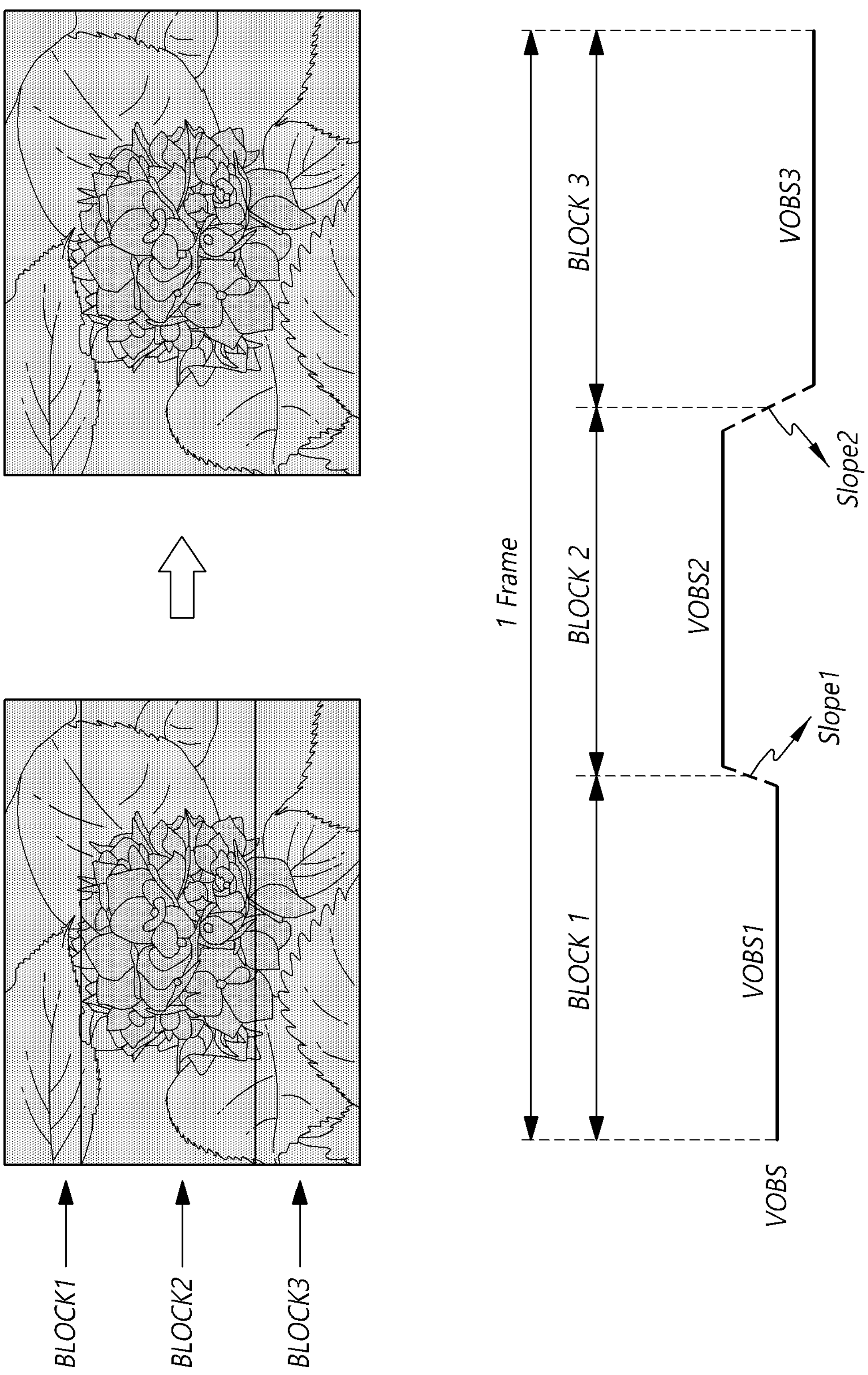
FIG. 7 is a diagram illustrating a case in which different bias voltages are applied to different areas of the display panel in the display device according to embodiments of the present disclosure.

FIG. 7 is a diagram illustrating a case in which different bias voltages are applied to different areas of the display panel in the display device according to embodiments of the present disclosure.

Referring to FIG. 7, in the display device 100 according to the embodiments, the display panel 110 can be divided into a plurality of blocks, and different levels of bias voltages VOBS1, VOBS2, and VOBS3 can be applied according to the grayscale of each block.

The method of dividing the display panel 110 into a plurality of blocks can be determined variously. Here, a case of dividing the display panel 110 into atop first block BLOCK1, a central second block BLOCK2, and a bottom third block BLOCK3 is illustrated as an example. Embodiments are not limited thereto. As an example, the display panel 110 can be divided into blocks with the same areas or different areas, into blocks with the same shape or different shapes, or into blocks with regular or irregular shapes, without being limited thereto. As an example, the display panel 110 can be divided into blocks separated in a vertical direction, such that the edges of the blocks are in parallel with the gate lines.

The grayscales for the plurality of blocks BLOCK1, BLOCK2, and BLOCK3 of the display panel 110 can be determined on the basis of the OPR indicating the ratio between emitting pixels and non-emitting pixels in a corresponding block in a specific frame.

For example, the first block BLOCK1 and the third block BLOCK3 respectively including a greater number of emitting pixels can have a high grayscale of high luminance, while the second block BLOCK2 including a smaller number of emitting pixels can have a low grayscale of low luminance.

In this case, a bias voltage VOBS2 applied to the second block BLOCK2 having a low grayscale can be set to a higher level than each of bias voltages VOBS1 and VOBS3 applied to the high-grayscale first and third blocks BLOCK1 and BLOCK3.

In addition, when different bias voltages VOBS1, VOBS2, and VOBS3 are applied to the blocks BLOCK1, BLOCK2, and BLOCK3 of the display panel 110, a deviation in luminance can occur among the blocks BLOCK1, BLOCK2, and BLOCK3, thereby causing a block dimming phenomenon in which the boundary between blocks is visually recognized.

In the display device 100 according to the embodiments of the present disclosure, when different levels of bias voltages are applied to the plurality of blocks of the display panel 110, the block dimming phenomenon among the plurality of blocks can be reduced by gradually changing the bias voltage to be below a reference slope in the boundary period of corresponding blocks. As an example, the boundary period can be at least one horizontal period. As an example, the boundary period can be less than 20 horizontal periods, less than 10 horizontal periods, less than 5 horizontal periods or less than 3 horizontal periods.

Here, the reference slope of the bias voltages changing in the boundary period between blocks can be determined by the difference in grayscale between the adjacent blocks.

For example, when the difference in level between the first bias voltage VOBS1 applied to the first block BLOCK1 and the second bias voltage VOBS2 applied to the second block BLOCK2 is small (e.g., insignificant), there is an insignificant difference in luminance in the boundary period. Thus, a first slope Slope1 changing from the first bias voltage VOBS1 to the second bias voltage VOBS2 can have a relatively large value. As another example, for at least one boundary period, when the difference in level between the first bias voltage VOBS1 applied to the first block BLOCK1 and the second bias voltage VOBS2 applied to the second block BLOCK2 is insignificant, the first bias voltage VOBS1 can be directly changed to the second bias voltage VOBS2, without a slope.

In contrast, when the difference in level between the second bias voltage VOBS2 applied to the second block BLOCK2 and the third bias voltage VOBS3 applied to the third block BLOCK3 is significant, there is a significant difference in luminance in the boundary period. Thus, the value of a second slope Slope2 changing from the second bias voltage VOBS2 to the third bias voltage VOBS3 can be smaller than that of the first slope Slope1.

In addition, the display device 100 according to the present disclosure can reduce image defects such as a horizontal line by applying different levels of bias voltages to the plurality of blocks of the display panel 110 and controlling the bias voltages differently in a refresh frame and in a skip frame.

Figure 8:
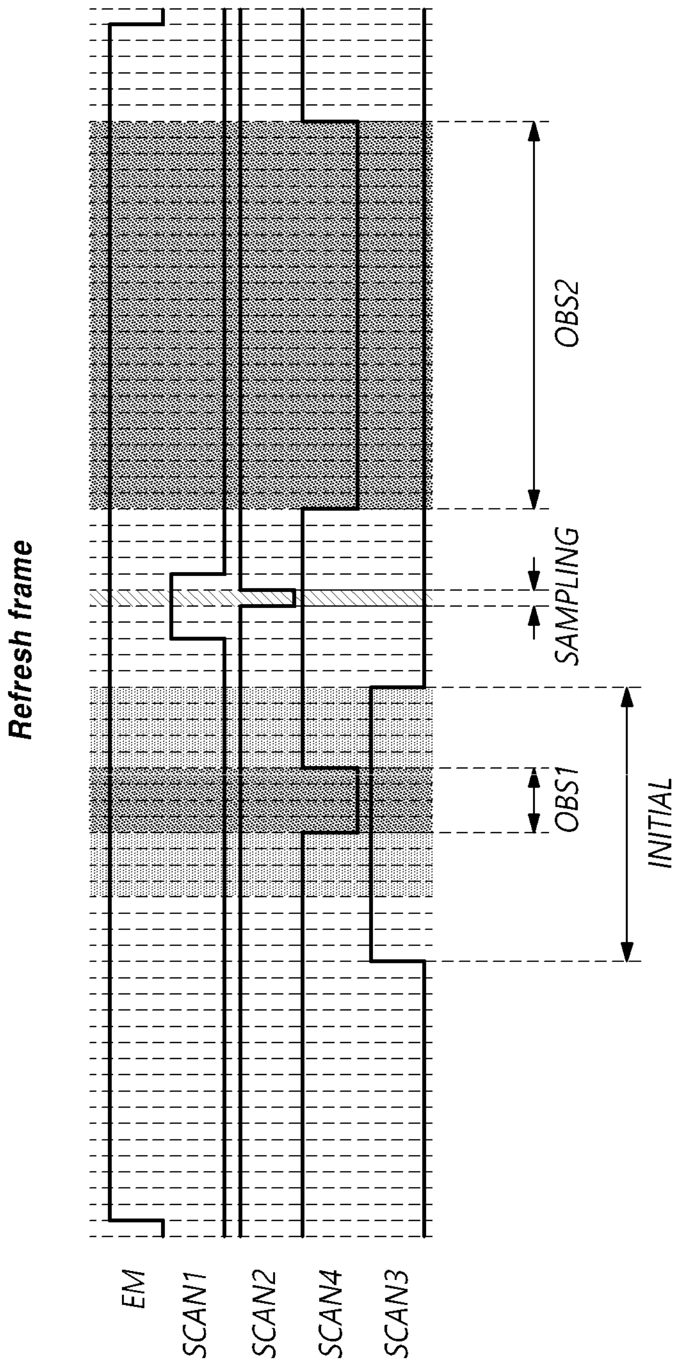
FIG. 8 is a diagram illustrating a signal waveform in a refresh frame period in the display device according to embodiments of the present disclosure.

FIG. 8 is a diagram illustrating a signal waveform in a refresh frame period in the display device according to embodiments of the present disclosure.

Referring to FIG. 8, the display device 100 according to the embodiments can perform on-bias processes OBS1 and OBS2 of applying bias voltages in a refresh frame period in order to reduce flicker caused by a deviation in luminance between a refresh frame and a skip frame in the second mode Mode 2 operating at a low-speed driving frequency. As an example, at least one of the on-bias processes OBS1 and OBS2 can be omitted in the refresh frame period.

The second mode Mode 2 operating at a low-speed driving frequency can be divided into a refresh frame in which image data is displayed and a skip frame in which the image data is not displayed.

In the refresh frame, the on-bias processes OBS1 and OBS2 of not only applying a data voltage Vdata and an initialization voltage Vini for driving of the subpixel SP and a reset voltage VAR but also applying a bias voltage VOBS to set the driving transistor DRT to an on-bias state before an emission period can be additionally performed.

In addition, in the refresh frame, a sampling process SAMPLING of compensating for the characteristic value (e.g., threshold voltage or mobility) of the driving transistor DRT can be performed.

When the sampling process SAMPLING is performed, the on-bias processes OBS1 and OBS2 can be performed in a period in which the sampling process SAMPLING is not performed.

In this case, in the refresh frame, the first on-bias process OBS1 can be performed in a state in which the fifth switching transistor T5 is turned on and the first switching transistor T1 and the second switching transistor T2 are turned off.

For example, in a state in which the fifth switching transistor T5 is turned on and the initialization voltage Vini is applied to the gate electrode of the driving transistor DRT, the bias voltage VOBS can be supplied to the source electrode of the driving transistor DRT during the first on-bias process OBS1 in the refresh frame. In this case, when the driving transistor DRT is turned on by a charge in the storage capacitor Cst, the bias voltage VOBS can be supplied to both the source electrode and the drain electrode of the driving transistor DRT.

In this manner, when the first on-bias process OBS1 is performed in a period in which the initialization voltage Vini is applied, voltages on the gate electrode and the drain electrode of the driving transistor DRT can be maintained to be constant. Thus, when the first on-bias process OBS1 is performed in a period in which the initialization voltage Vini is applied, it can be effective to maintain the bias voltage VOBS at a fixed level even in the case in which the grayscale of the image data applied to the display panel 110 is changed or differs according to region.

For example, in a period in which the initialization voltage Vini is applied to the gate electrode of the driving transistor DRT in the refresh frame, the bias voltage can be maintained at a constant value.

As a result, in the refresh frame of the second mode Mode 2 operating at a low-speed driving frequency, the hysteresis of the driving transistor DRT can be reduced and the luminance of the light-emitting element ED can be less reduced.

In addition, the second on-bias process OBS2 in the refresh frame can be performed in a state in which all of the fifth switching transistor T5, the first switching transistor T1, and the second switching transistor T2 are turned off.

Figure 9:
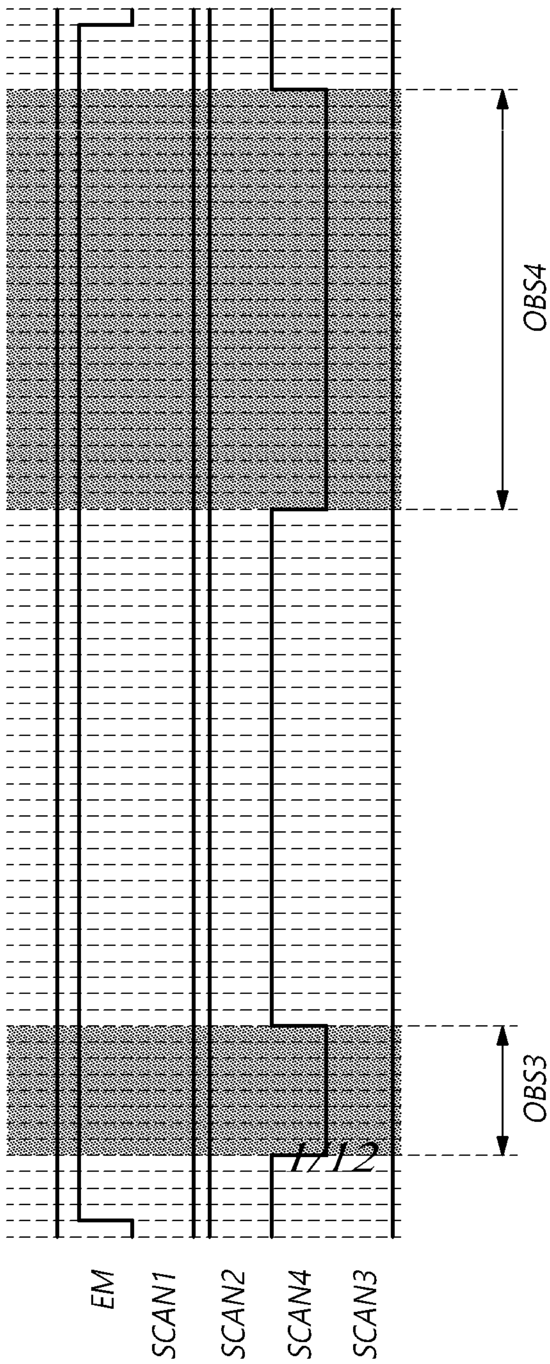
FIG. 9 is a diagram illustrating a signal waveform in a skip frame period in the display device according to embodiments of the present disclosure.

FIG. 9 is a diagram illustrating a signal waveform in a skip frame period in the display device according to embodiments of the present disclosure.

Referring to FIG. 9, in the display device 100 according to the embodiments, after a refresh frame, a skip frame in which an image is not transferred to the display panel 110 and a voltage stored in the storage capacitor Cst is maintained can be performed.

In this case, in the display device 100, a bias voltage VOBS capable of reducing hysteresis in the skip frame can be applied to the drain electrode or the source electrode of the driving transistor DRT once or more.

Here, a case in which third and fourth on-bias processes OBS3 and OBS4 are performed in the skip frame is illustrated. As an example, at least one of the on-bias processes OBS3 and OBS4 can be omitted in the skip frame.

In this case, in the skip frame, the third and/or fourth on-bias processes OBS3 and/or OBS4 can be performed in a period in which the initialization voltage Vini is not applied to the gate electrode of the driving transistor DRT.

In this manner, in the period in which the initialization voltage Vini is not applied to the gate electrode of the driving transistor DRT, voltages on the gate electrode and the drain electrode of the driving transistor DRT can be changed. In this case, the bias voltage can be changed with changes in the grayscale of image data supplied to the display panel 110 or depending on the difference in grayscale among the regions of the display panel 110.

Figure 10:
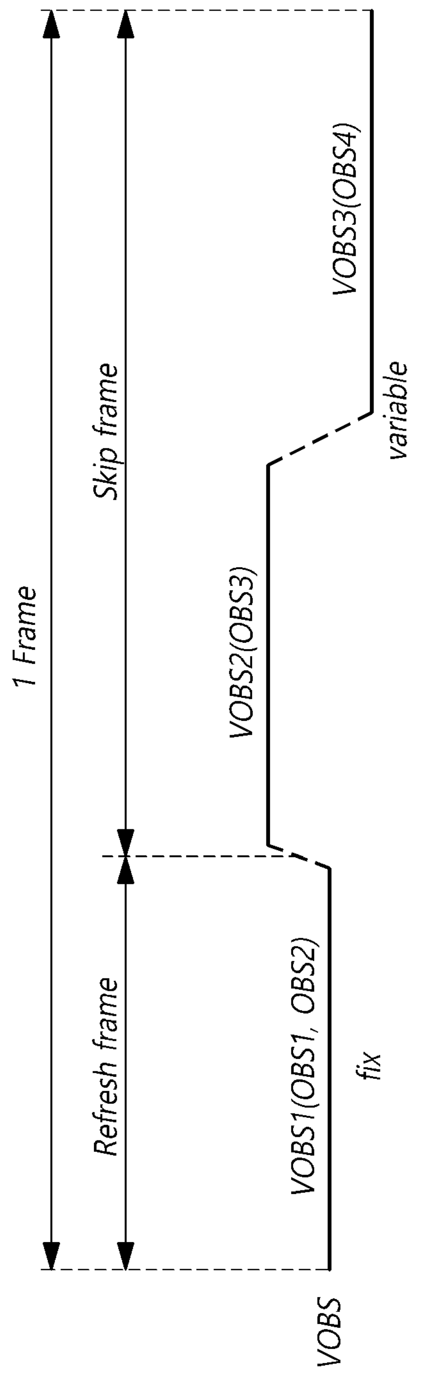
FIG. 10 is a diagram illustrating a case in which a bias voltage applied in a refresh frame and a bias voltage applied in a skip frame are controlled differently in the display device according to embodiments of the present disclosure.

FIG. 10 is a diagram illustrating a case in which a bias voltage applied in a refresh frame and a bias voltage applied in a skip frame are controlled differently in the display device according to embodiments of the present disclosure.

Referring to FIG. 10, the display device 100 according to the embodiments can perform on-bias processes OBS1 and OBS2 of applying a bias voltage VOBS1 in a refresh frame period in order to reduce flicker caused by a deviation in luminance in the second mode Mode 2 operating at a low-speed driving frequency.

In this case, in a period in which an initialization voltage Vini is applied to the gate electrode of the driving transistor DRT in the refresh frame, the first bias voltage VOBS1 can be maintained at a constant value.

Here, the initialization voltage Vini can be applied in a period of the first on-bias process OBS1 and can be applied in a period of the second on-bias process OBS2.

For example, when the initialization voltage Vini is applied in the period of the first on-bias process OBS1, voltages on the gate electrode and the drain electrode of the driving transistor DRT can be maintained to be constant. Thus, when the initialization voltage Vini is applied in the period of the first on-bias process OBS1, even in the case in which the grayscale of image data applied to the display panel 110 is changed or differs according to the blocks of the display panel 110, it can be effective to maintain the first bias voltage VOBS1 at a fixed level.

In addition, when the initialization voltage Vini is also applied in the period of the second on-bias process OBS2, it can be effective to maintain the same bias level in the period of the second on-bias process OBS2 as the first bias voltage VOBS1 applied in the period of the first on-bias process OBS1.

Here, in the refresh frame, the bias voltage VOBS1 having the same level can be applied according to the periods of the on-bias processes OBS1 and OBS2. In addition, even in the case in which respective blocks among the plurality of blocks of the display panel 110 have different grayscales, the bias voltage VOBS1 having the same level can be applied.

In addition, third and fourth on-bias processes OBS3 and OBS4 can be performed in the skip frame. In this case, in the period of the third on-bias process OBS3 and the period of the fourth on-bias process OBS4, the initialization voltage Vini may not be applied to the gate electrode of the driving transistor DRT.

In this manner, in the skip frame in which the initialization voltage Vini is not applied to the gate electrode of the driving transistor DRT, voltages on the gate electrode and the drain electrode of the driving transistor DRT can be changed. Thus, different bias voltages VOBS2 and VOBS3 can be applied in the period of the third on-bias process OBS3 and in the period of the fourth on-bias process OBS4.

In addition, in the skip frame, the bias voltages VOBS2 and VOBS3 having different levels can be applied according to the periods of the on-bias processes OBS3 and OBS4 and can be applied by reflecting the grayscale of each block of the plurality of blocks in the display panel 110.

Figure 11:
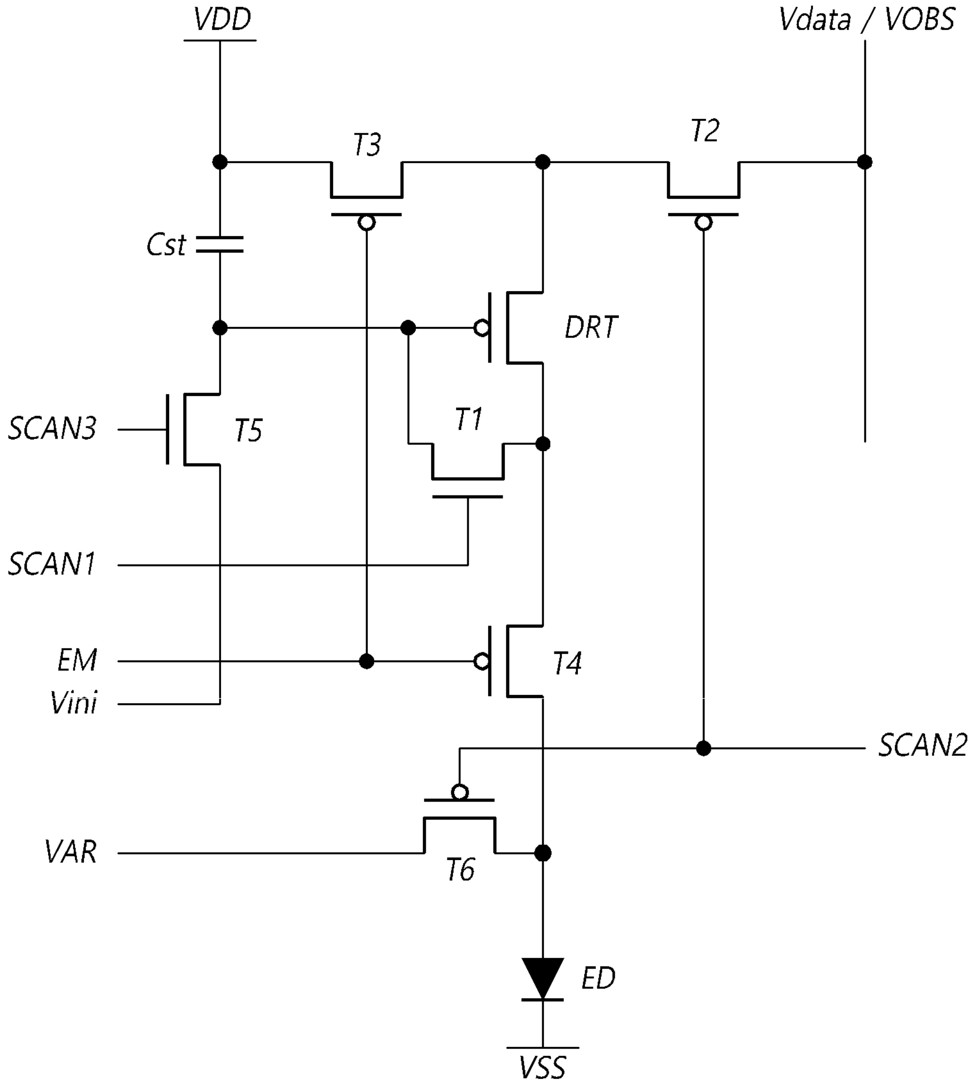
FIG. 11 is a diagram illustrating another subpixel circuit of the display device according to embodiments of the present disclosure.

FIG. 11 is a diagram illustrating another subpixel circuit of the display device according to embodiments of the present disclosure.

Referring to FIG. 11, a subpixel SP of the display device 100 according to the embodiments includes first to sixth switching transistors T1 to T6, a driving transistor DRT, a storage capacitor Cst, and a light-emitting element ED.

Here, the light-emitting element ED can be a self-light-emitting element, such as an OLED or an LED, able to emit light by itself.

In the subpixel SP according to the embodiments of the present disclosure, the second to fourth switching transistors T2 to T4, the sixth switching transistor T6, and the driving transistor DRT can be P-type transistors, while the first switching transistor T1 and the fifth switching transistor T5 can be N-type transistors, without being limited thereto. As an example, any of the transistors can be any of the P-type transistor and the N-type transistor.

P-type transistors are more reliable than N-type transistors. When the driving transistor DRT is formed of a P-type transistor, there is an advantage in that current flowing through the light-emitting element ED is not fluctuated by the capacitor Cst, since the drain electrode is fixed to a high-potential driving voltage VDD. Thus, it is easy to reliably supply current.

For example, P-type transistors can be connected to an anode of the light-emitting element ED. Here, when the transistors T4 and T6 connected to the light-emitting element ED operate in a saturation region, reliability is relatively high, since a predetermined amount of current can be flown irrespective of changes in the current and threshold voltage of the light-emitting element ED.

In this structure of the subpixel SP, each of the N-type transistors T1 and T5 can be formed of an oxide transistor (e.g., a transistor having a channel formed from a semiconducting oxide such as an In, Ga, or Zn oxide or an IGZO) formed using a semiconducting oxide, while each of the P-type transistors DRT, T2 to T4, and T6 can be formed of a Si transistor (e.g., a transistor referred to as an LTPS transistor having a poly-Si channel formed using a low-temperature process) formed from a transistor material such as Si, without being limited thereto.

The oxide transistor is characterized by a lower leakage current than the silicon transistor. Thus, when a transistor is formed of an oxide transistor, a leakage current from the gate electrode of the driving transistor DRT can be prevented, thereby reducing defects in image quality such as flicker.

In addition, each of the P-type transistors DRT, T2 to T4, and T6, except for the N-type transistors such as the first switching transistor T1 and the fifth switching transistor T5, can be formed of an LTPS transistor. However, the present disclosure is not limited thereto, and the N-type transistors and the P-type transistors can have the same or different configurations.

The gate electrode of the first switching transistor T1 is provided with a first scan signal SCAN1. The drain electrode of the first switching transistor T1 is connected to the gate electrode of the driving transistor DRT. In addition, the source electrode of the first switching transistor T1 is connected to the source electrode of the driving transistor DRT. The drain electrode and the source electrode of the switching transistor can vary depending on flow of current.

The source electrode of the first transistor T1 is connected to the drain electrode of the driving transistor DRT.

The first switching transistor T1 can be turned on by the first scan signal SCAN1 to control the operation of the driving transistor DRT using the voltage, e.g., the high-potential driving voltage VDD, stored in the storage capacitor Cst.

The first switching transistor T1 can be formed of an oxide transistor, in particular, an N-type MOS transistor, without being limited thereto. Since the N-type MOS transistor uses electrons as carriers instead of holes, the N-type MOS transistor can have higher mobility and thus higher switching speeds than a P-type MOS transistor.

The gate electrode of the second switching transistor T2 is provided with a second scan signal SCAN2. The source electrode of the second switching transistor T2 can be provided with a data voltage Vdata or a bias voltage VOBS. The drain electrode of the second switching transistor T2 is connected to the source electrode of the driving transistor DRT.

The second switching transistor T2 is turned on by the second scan signal SCAN2 to supply the data voltage Vdata or the bias voltage VOBS to the source electrode of the driving transistor DRT.

The gate electrode of the third switching transistor T3 is provided with an emission signal EM. The source electrode of the third switching transistor T3 is provided with the high-potential driving voltage VDD. The drain electrode of the third switching transistor T3 is connected to the source electrode of the driving transistor DRT.

The third switching transistor T3 is turned on by the emission signal EM to supply the high-potential driving voltage VDD to the source electrode of the driving transistor DRT.

The gate electrode of the fourth switching transistor T4 is provided with the emission signal EM. The source electrode of the fourth switching transistor T4 is connected to the drain electrode of the driving transistor DRT. The drain electrode of the fourth switching transistor T4 is connected to the anode of the light-emitting element ED.

The fourth switching transistor T4 is turned on by the emission signal EM to supply a driving current to the anode of the light-emitting element ED.

The gate electrode of the fifth switching transistor T5 is provided with a third scan signal SCAN3.

Here, the third scan signal SCAN3 can be a signal having a different phase from the first scan signal SCAN1 supplied to a subpixel SP in another position. For example, when the first scan signal SCAN1 is applied to the nth gate line, the third scan signal SCAN3 can be a first scan signal SCAN1 [*n*−9] applied to the (n−9)th gate line, without being limited thereto. As an example, the third scan signal SCAN3 can use the first scan signal SCAN1, the gate line GL of which differs depending on the phase at which the display panel 110 is driven.

The source electrode of the fifth switching transistor T5 is provided with an initialization voltage Vini. The drain electrode of the fifth switching transistor T5 is connected to the gate electrode of the driving transistor DRT and the storage capacitor Cst.

The fifth switching transistor T5 is turned on by the third scan signal SCAN3 to supply the initialization voltage Vini to the gate electrode of the driving transistor DRT.

The gate electrode of the sixth switching transistor T6 is provided with the second scan signal SCAN2, together with the second switching transistor T2.

The drain electrode of the sixth switching transistor T6 is provided with a reset voltage VAR. The source electrode of the sixth switching transistor T6 is connected to the anode of the light-emitting element ED.

The sixth switching transistor T6 is turned on by the second scan signal SCAN2 to supply the reset voltage VAR to the anode of the light-emitting element ED.

The gate electrode of the driving transistor DRT is connected to the drain electrode of the first switching transistor T1. The source electrode of the driving transistor DRT is connected to the drain electrode of the second switching transistor T2. The drain electrode of the driving transistor DRT is connected to the source electrode of the first switching transistor T1.

The driving transistor DRT is turned on due to the difference in voltage between the source electrode and the drain electrode of the first switching transistor T1, and thus the driving current is applied to the light-emitting element ED.

The high-potential driving voltage VDD is applied to one side of the storage capacitor Cst, and the other side of the storage capacitor Cst is connected to the gate electrode of the driving transistor DRT. The storage capacitor Cst stores a voltage on the gate electrode of the driving transistor DRT.

The anode of the light-emitting element ED is connected to the drain electrode of the fourth switching transistor T4 and the source electrode of the sixth switching transistor T6. A low-potential driving voltage VSS is applied to the cathode of the light-emitting element ED.

The light-emitting element ED generates light having a predetermined luminous intensity by using the driving current flowing therethrough due to the driving transistor DRT.

Here, the initialization voltage Vini is supplied to stabilize changes in capacitance generated in the gate electrode of the driving transistor DRT, while the reset voltage VAR is supplied to reset the anode of the light-emitting element ED.

When the reset voltage VAR is supplied to the anode of the light-emitting element ED in a state in which the fourth switching transistor T4 located between the anode of the light-emitting element ED and the driving transistor DRT to be controlled by the emission signal EM is turned off, the anode of the light-emitting element ED can be reset.

The sixth switching transistor T6 supplying the reset voltage VAR is connected to the anode of the light-emitting element ED.

As an example, the third scan signal SCAN3 for driving the driving transistor DRT or initializing the driving transistor DRT and the second scan signal SCAN2 for controlling the supply of the reset voltage VAR to the anode of the light-emitting element ED are separated so that the operation of driving the driving transistor DRT and the operation of resetting the anode of the light-emitting element ED can be performed separately.

In this case, the subpixel SP can be configured to turn off the fourth switching transistor T4 connecting the drain electrode of the driving transistor DRT and the anode of the light-emitting element ED when turning on the switching transistors T5 and T6 supplying the initialization voltage Vini and the reset voltage VAR, thereby blocking flow of the driving current of the driving transistor DRT to the anode of the light-emitting element ED and reducing or preventing other voltages from having an effect on the anode than the reset voltage VAR.

The subpixel SP including the seven transistors DRT, T1, T2, T3, T4, T5, and T6 and the single capacitor Cst as described above can be referred to as having an 7T1C structure.

As described above, the 7T1C structure among a variety of circuit structures of the subpixel SP has been illustrated hereinabove, and the structure and number of the transistors and the capacitors of the subpixel SP can be changed variously. Respective subpixels among the plurality of subpixels SP can have the same structure or some subpixels among the plurality of subpixels SP can have a different structure.

Figure 12:
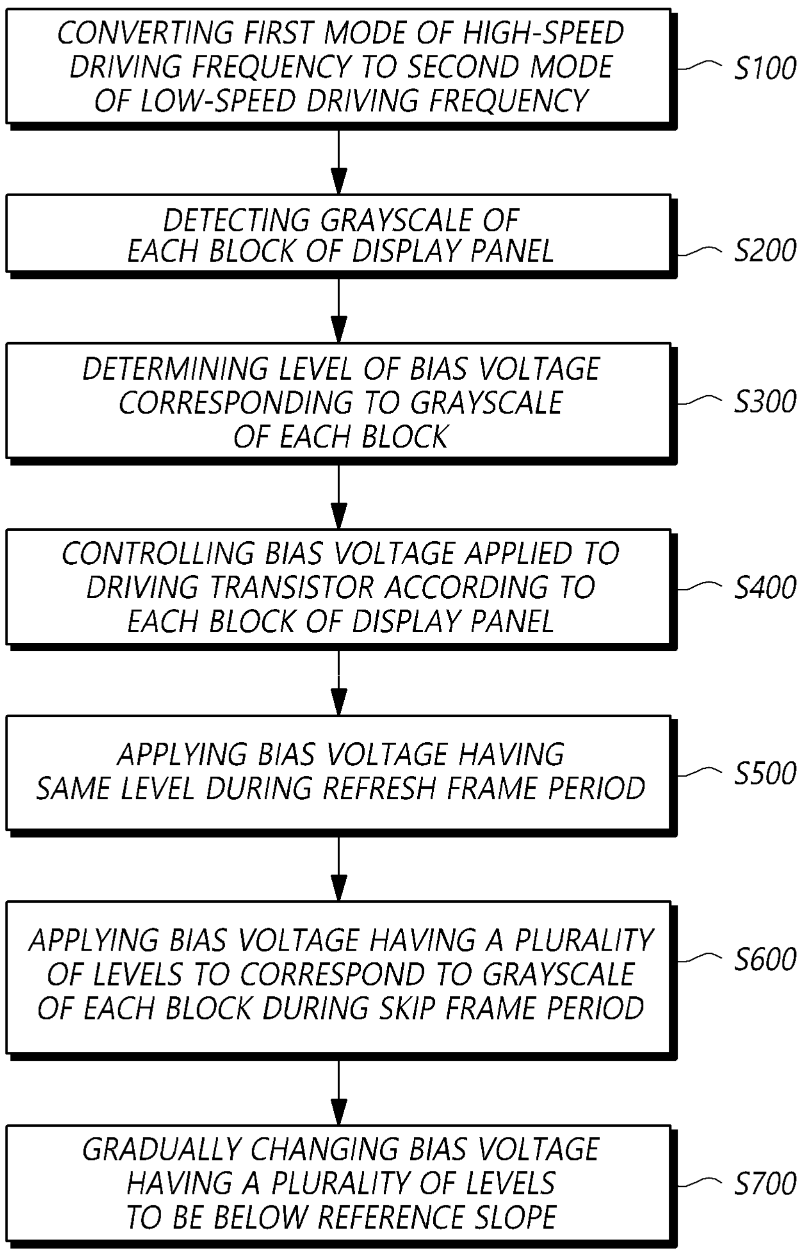
FIG. 12 is a flowchart illustrating a display driving method according to embodiments of the present disclosure.

FIG. 12 is a flowchart illustrating a display driving method according to embodiments of the present disclosure.

Referring to FIG. 12, the display driving method according to the embodiments can include: step/operation S100 of converting a first mode of a high-speed driving frequency to a second mode of a low-speed driving frequency; step/operation S200 of detecting the grayscale of each block of the display panel 110; step/operation S300 of determining the level of a bias voltage VOBS corresponding to the grayscale of each block; step/operation S400 of controlling the bias voltage applied to the driving transistor DRT according to each block of the display panel 110; step/operation S500 of applying the bias voltage having the same level during a refresh frame period; step/operation S600 of applying the bias voltage VOBS having a plurality of levels to correspond to the grayscale of each block during a skip frame period; and step/operation S700 of gradually changing the bias voltage VOBS having the plurality of levels to be below a reference slope.

The step S100 of converting the first mode of the high-speed driving frequency to the second mode of the low-speed driving frequency is, for example, a process of converting from the first mode Mode 1 in which video images are displayed at the high-speed first frequency to the second mode Mode 2 in which still images or low-speed images are displayed at the low-speed second frequency.

The step S200 of detecting the grayscale of each block of the display panel 110 is a process of dividing the display panel 110 into a plurality of blocks (or regions) and determining the grayscale on the basis of an on-pixel ratio (OPR) indicating the ratio between emitting pixels and non-emitting pixels in each block.

The step S300 of determining the level of the bias voltage VOBS corresponding to the grayscale of each block is a process of determining the level of the bias voltage VOBS at which image defects can be reduced or minimized, with respect to the grayscale of each block determined on the basis of the OPR. For example, the bias voltage VOBS can be set to a higher level with respect to a lower-grayscale block, while the bias voltage VOBS can be set to a lower level with respect to a higher-grayscale block.

The step S400 of controlling the bias voltage applied to the driving transistor DRT according to the blocks of the display panel 110 is a process of applying the bias voltage VOBS having a level determined according to the grayscale of each block to the driving transistor DRT. The VOBS having the same bias voltage can be applied to blocks having the same or similar grayscale, while the bias voltage VOBS having different levels can be applied to blocks having different grayscales.

The step S500 of applying the bias voltage having the same level during the refresh frame is a process of maintaining the bias voltage VOBS to be constant at a single fixed level during the refresh frame in which image data is supplied to the display panel 110.

During the refresh frame, the grayscale of the image data can be changed according to the frame, or the bias voltage VOBS can be maintained at a single fixed level even in the case in which the blocks of the display panel 110 have different grayscales.

In particular, when an on-bias process OBS is performed during a period in which the initialization voltage Vini, voltages on the gate electrode and the drain electrode of the driving transistor DRT can be maintained to be constant in the refresh frame, and thus the bias voltage VOBS can be maintained at a single level.

The step S600 of applying the bias voltage VOBS having a plurality of levels to correspond to the grayscale of each block during the skip frame is a process of varying the bias voltage VOBS according to the grayscale of the image data during the skip frame in which the image data is not transferred to the display panel 110 and a voltage stored in the storage capacitor Cst is maintained.

In this case, the bias voltage VOBS can be determined according to the grayscale of the image data varying in respective frames or can be determined according to the grayscale of each block of the display panel 110.

The step S700 of gradually changing the bias voltage VOBS having the plurality of levels to be below the reference slope is a process of controlling the bias voltage to be gradually changed below the reference slope when a first-level bias voltage is converted to a second-level bias voltage in the skip frame.

When the bias voltage is gradually changed below the reference slope as described above, the block dimming phenomenon caused by the difference in luminance between the blocks can be reduced.

In addition, the step S500 of applying the bias voltage having the same level during the refresh frame, the step S600 of applying the bias voltage VOBS having a plurality of levels to correspond to the grayscale of each block during the skip frame, and the step S700 of gradually changing the bias voltage VOBS having the plurality of levels to be below the reference slope can be omitted or can be selectively used according to the display device 100.

The above-described embodiments of the present disclosure will be briefly reviewed as follows.

A display device 100 according to embodiments can include a display panel 110 on which a light-emitting element ED, a driving transistor DRT providing a driving current to the light-emitting element using a driving voltage, and a plurality of switching transistors controlling driving of the driving transistor DRT are disposed; a gate driving circuit 120 supplying a plurality of scan signals to the display panel 110 through a plurality of gate lines GL; an emission driving circuit 122 supplying a plurality of emission signals EM to the display panel 110 through a plurality of emission signal lines EL; a data driving circuit 130 supplying a data voltage to the display panel 110; and a timing controller dividing the display panel 110 into a plurality of blocks and controlling a level of a bias voltage VOBS applied to the driving transistor DRT of a corresponding block among the plurality of blocks according to a grayscale of the data voltage supplied to the corresponding block in a low-speed mode operating at a low-speed driving frequency.

The low-speed mode can include a refresh frame period in which the data voltage for driving the light-emitting element ED is applied to the display panel 110 and a skip frame period in which the data voltage is not applied to the display panel 110 and a voltage stored in a storage capacitor is maintained.

The plurality of switching transistors can include a first switching transistor T1 having a gate electrode to which a first scan signal SCAN1 is applied, a drain electrode connected to a gate electrode of the driving transistor DRT and the storage capacitor Cst, and a source electrode connected to a drain electrode of the driving transistor DRT; a second switching transistor T2 having a gate electrode to which a second scan signal SCAN2 is applied, a source electrode to which the data voltage or the bias voltage VOBS is applied, and a drain electrode connected to a source electrode of the driving transistor DRT; a third switching transistor T3 having a gate electrode to which an emission signal EM is applied, a source electrode to which the driving voltage is applied, and a drain electrode connected to the source electrode of the driving transistor DRT; a fourth switching transistor T4 having a gate electrode to which the emission signal EM is applied, a source electrode connected to the drain electrode of the driving transistor DRT, and a drain electrode connected to an anode of the light-emitting element ED; a fifth switching transistor T5 having a gate electrode to which a third scan signal SCAN3 is applied, a drain electrode to which an initialization voltage Vini is supplied, and a source electrode connected to the gate electrode of the driving transistor DRT; and a sixth switching transistor T6 having a gate electrode to which the second scan signal SCAN2 is applied, a source electrode to which a reset voltage VAR is supplied, and a drain electrode connected to the anode of the light-emitting element ED.

The plurality of switching transistors can include a first switching transistor T1 having a gate electrode to which a first scan signal SCAN1 is applied, a drain electrode connected to a gate electrode of the driving transistor DRT and the storage capacitor Cst, and a source electrode connected to a drain electrode of the driving transistor DRT; a second switching transistor T2 having a gate electrode to which a second scan signal SCAN2 is applied, a source electrode to which the data voltage is applied, and a drain electrode connected to a source electrode of the driving transistor DRT; a third switching transistor T3 having a gate electrode to which an emission signal EM is applied, a source electrode to which the driving voltage is applied, and a drain electrode connected to the source electrode of the driving transistor DRT; a fourth switching transistor T4 having a gate electrode to which the emission signal EM is applied, a source electrode connected to the drain electrode of the driving transistor DRT, and a drain electrode connected to an anode of the light-emitting element ED; a fifth switching transistor T5 having a gate electrode to which a third scan signal SCAN3 is applied, a drain electrode to which an initialization voltage Vini is supplied, and a source electrode connected to the gate electrode of the driving transistor DRT; a sixth switching transistor T6 having a gate electrode to which a fourth scan signal SCAN4 is applied, a source electrode to which a reset voltage VAR is supplied, and a drain electrode connected to the anode of the light-emitting element ED; and a seventh switching transistor T7 having a gate electrode to which the fourth scan signal SCAN4 is applied, a source electrode to which the bias voltage VOBS is supplied, and a drain electrode connected to the source electrode of the driving transistor DRT.

The level of the bias voltage VOBS can be determined according to an on-pixel ratio of the corresponding block.

The level of the bias voltage VOBS can be gradually changed below a reference slope in a boundary period of the plurality of blocks.

The reference slope can include a first slope Slope1 applied when a difference in grayscale between adjacent blocks among the plurality of blocks is equal to or smaller than a reference value; and a second slope Slope2 applied when the difference in grayscale between adjacent blocks among the plurality of blocks is greater than the reference value, in which the second slope Slope2 can be smaller than the first slope Slope1.

The initialization voltage Vini can be applied in the refresh frame period, while the bias voltage VOBS can be applied in the refresh frame period or a skip frame period.

The bias voltage having the same level can be applied during a refresh frame, while the bias voltage having a plurality of levels corresponding to the grayscale of the data voltage can be applied during a skip frame.

The bias voltage having the same level can be applied in a period in which the initialization voltage Vini is applied.

According to embodiments, also provided is a display driving method of driving a display panel 110 in which a light-emitting element ED, a driving transistor DRT providing a driving current to the light-emitting element ED using a driving voltage, and a plurality of switching transistors controlling driving of the driving transistor DRT are disposed. The display driving method can include step S100 of converting a first mode of a high-speed driving frequency to a second mode of a low-speed driving frequency; step S200 of detecting the grayscale of each block of the display panel 110; step S300 of determining the level of a bias voltage VOBS corresponding to the grayscale of each block; and step S400 of controlling the level of the bias voltage VOBS applied to the driving transistor DRT according to the blocks of the display panel 110.

The display driving method can further include step S500 of applying the bias voltage having the same level during a refresh frame period in which a data voltage for driving the light-emitting element ED is applied to the display panel 110; and step S600 of applying the bias voltage having a plurality of levels to correspond to the grayscale of each block during a skip frame period in which the data voltage is not applied to the display panel 110 and a voltage stored in a storage capacitor Cst is maintained.

During the refresh frame period, the initialization voltage Vini for stabilizing changes in capacitance occurring on the gate electrode of the driving transistor DRT can be applied.

The bias voltage having the same level can be applied in a period in which the initialization voltage Vini is applied.

The bias voltage having the plurality of levels can be gradually changed below a reference slope.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention.

What is claimed is:

1. A driving method for a display panel composed of a plurality of blocks on which a light-emitting element, a driving transistor providing a driving current to the light-emitting element using a driving voltage, and a plurality of switching transistors controlling driving of the driving transistor are disposed, the driving method comprising:

converting a first mode of a high-speed driving frequency to a second mode of a low-speed driving frequency;

detecting a grayscale of each block of the display panel;

determining a level of a bias voltage to be applied to a source electrode of the driving transistor corresponding to the grayscale of each block; and controlling the level of the bias voltage according to each block of the display panel.

2. The driving method according to claim 1, further comprising:

applying the bias voltage having a same level for each block during a refresh frame period in which a data voltage for driving the light-emitting element is applied to the display panel; and applying the bias voltage having a plurality of levels to correspond to the grayscale of each block during a skip frame period in which the data voltage is not applied to the display panel and a voltage stored in a storage capacitor connected to a gate electrode of the driving transistor is maintained.

3. The driving method according to claim 2, wherein an initialization voltage for stabilizing changes in capacitance occurring on the gate electrode of the driving transistor is applied during the refresh frame period.

4. The driving method according to claim 3, wherein the bias voltage having the same level is applied for each block in a period in which the initialization voltage is applied.

5. The driving method according to claim 2, wherein the bias voltage having the plurality of levels is gradually changed below a reference slope.

6. The driving method according to claim 2, wherein the level of the bias voltage is determined according to an on-pixel ratio of a corresponding block, and wherein the on-pixel ratio indicates a ratio between emitting pixels and non-emitting pixels of the corresponding block in the corresponding frame.

7. The driving method according to claim 6, wherein during the skip frame period, the bias voltage is set to a higher level with respect to a block having a lower on-pixel ratio, and is set to a lower level with respect to a block having a higher on-pixel ratio.

8. A display device comprising:

a display panel composed of a plurality of blocks on which a light-emitting element, a driving transistor and a plurality of switching transistors are disposed, wherein the driving transistor provides a driving current to the light-emitting element using a driving voltage, and the plurality of switching transistors control a driving operation of the driving transistor;

a gate driving circuit configured to supply a plurality of scan signals to the display panel through a plurality of gate lines;

a data driving circuit configured to supply a data voltage to the display panel; and a timing controller configured to control a level of a bias voltage to be applied to a source electrode of the driving transistor of a corresponding block among the plurality of blocks according to a grayscale of the data voltage supplied to the corresponding block in a low-speed mode operating at a low-speed driving frequency.

9. The display device according to claim 8, wherein the low-speed mode includes:

a refresh frame period in which the data voltage for driving the light-emitting element is applied to the display panel; and a skip frame period in which the data voltage is not applied to the display panel and a voltage stored in a storage capacitor connected to a gate electrode of the driving transistor is maintained.

10. The display device according to claim 9, wherein during the skip frame period, the bias voltage is set to a higher level with respect to a block having a lower on-pixel ratio, and is set to a lower level with respect to a block having a higher on-pixel ratio.

11. The display device according to claim 9, wherein the plurality of switching transistors include:

a first switching transistor having a gate electrode to which a first scan signal is applied, a drain electrode connected to the gate electrode of the driving transistor, and a source electrode connected to a drain electrode of the driving transistor;

a second switching transistor having a gate electrode to which a second scan signal is applied, a source electrode to which the data voltage or the bias voltage is applied, and a drain electrode connected to the source electrode of the driving transistor; and a fifth switching transistor having a gate electrode to which a third scan signal is applied, a drain electrode to which an initialization voltage is supplied, and a source electrode connected to the gate electrode of the driving transistor.

12. The display device according to claim 11, wherein the initialization voltage is applied in the refresh frame period, and the bias voltage is applied in the refresh frame period or the skip frame period.

13. The display device according to claim 12, wherein the bias voltage having a same level is applied for respective blocks during the refresh frame period, and the bias voltage having a plurality of levels corresponding to the grayscale of the data voltage is applied for respective blocks during the skip frame period.

14. The display device according to claim 13, wherein the bias voltage having the same level is applied in a period in which the initialization voltage is applied.

15. The display device according to claim 11, wherein the second switching transistor comprises:

a 2-1 switching transistor having a gate electrode to which the second scan signal is applied, a source electrode to which the data voltage is applied, and a drain electrode connected to the source electrode of the driving transistor; and a 2-2 switching transistor having a gate electrode to which a fourth scan signal is applied, a source electrode to which the bias voltage is supplied, and a drain electrode connected to the source electrode of the driving transistor.

16. The display device according to claim 11, wherein the plurality of switching transistors further include:

a third switching transistor having a gate electrode to which an emission signal is applied, a source electrode to which the driving voltage is applied, and a drain electrode connected to the source electrode of the driving transistor;

a fourth switching transistor having a gate electrode to which the emission signal is applied, a source electrode connected to the drain electrode of the driving transistor, and a drain electrode connected to an anode of the light-emitting element; and a sixth switching transistor having a gate electrode to which the second scan signal is applied, a source electrode to which a reset voltage is supplied, and a drain electrode connected to the anode of the light-emitting element.

17. The display device according to claim 8, wherein the level of the bias voltage is determined according to an on-pixel ratio of the corresponding block.

18. The display device according to claim 17, wherein the on-pixel ratio indicates a ratio between emitting pixels and non-emitting pixels of the corresponding block in a corresponding frame.

19. The display device according to claim 8, wherein the level of the bias voltage is gradually changed by a slope lower than a reference slope in at least one boundary period of the plurality of blocks.

20. The display device according to claim 19, wherein the reference slope comprises:

a first slope applied when a difference in grayscale between adjacent blocks among the plurality of blocks is equal to or less than a reference value; and a second slope applied when the difference in grayscale between adjacent blocks among the plurality of blocks is greater than the reference value, wherein the second slope is less than the first slope.

21. The display device according to claim 20, wherein in at least one boundary period of the plurality of blocks, the level of the bias voltage is directly changed.

22. The display device according to claim 19, wherein the at least one boundary period is at least one horizontal period.

23. The display device according to claim 8, wherein the plurality of blocks are divided so that edges of each of the plurality of blocks are in parallel with the plurality of gate lines.

* * * * *